(12) United States Patent
Hill

(10) Patent No.: US 11,189,187 B2
(45) Date of Patent: *Nov. 30, 2021

(54) ONLINE PERSONALITY TESTING PROVIDING INDIVIDUAL CONTEXTUAL ASSESSMENTS IN A SECURE INTEGRATED ENVIRONMENT

(71) Applicant: Robert C. Hill, Des Peres, MO (US)

(72) Inventor: Robert C. Hill, Des Peres, MO (US)

( * ) Notice: Subject to any disclaimer, the term of this patent is extended or adjusted under 35 U.S.C. 154(b) by 350 days.

This patent is subject to a terminal disclaimer.

(21) Appl. No.: 16/374,307

(22) Filed: Apr. 3, 2019

(65) Prior Publication Data
US 2019/0228671 A1 Jul. 25, 2019

Related U.S. Application Data

(63) Continuation of application No. 14/318,553, filed on Jun. 27, 2014, now Pat. No. 10,297,167.

(51) Int. Cl.
*G09B 7/06* (2006.01)

(52) U.S. Cl.
CPC .................................. *G09B 7/06* (2013.01)

(58) Field of Classification Search
CPC .................................. G09B 19/00; G09B 7/06
See application file for complete search history.

(56) References Cited

U.S. PATENT DOCUMENTS

| | | | |
|---|---|---|---|
| 5,702,253 A | 12/1997 | Bryce et al. | |
| 5,871,211 A * | 2/1999 | Was | A63F 3/0478 273/242 |
| 6,159,015 A * | 12/2000 | Buffington | G09B 19/00 434/236 |
| 6,227,862 B1 * | 5/2001 | Harkness | G09B 9/05 434/238 |
| 6,893,265 B2 * | 5/2005 | Sadka | G09B 11/00 434/236 |
| 7,980,931 B1 * | 7/2011 | Krane | A63F 13/79 463/9 |

(Continued)

OTHER PUBLICATIONS

Unknown Author. "Publishing an API". <https://app.swaggerhub.com/help/apis/publishing-api>.
Blanchette, Jasmin. "The Little Manual of API Design".

*Primary Examiner* — Robert J Utama
(74) *Attorney, Agent, or Firm* — Armstrong Teasdale LLP

(57) ABSTRACT

A computerized method and computer-executable instructions for assessing personality and temperament characteristics of a registered user by a centralized computing device. The method includes providing a first user interface with at least two color elements for the user to sort in a "most like me" to "least like me" order. Upon receiving the user's sort order, the user is provided a second user interface with at least one word grouping, each word grouping having an associated life context, and the user indicates "most like me" to "least like me" in the word groupings. Upon receiving those results, the method then determine a contextual assessment based on the user's selection, with the assessment being weighted on the basis of the user's color element sort. In some embodiments, a temperament assessment service with a published API executes on a server, with access to the service requiring a user's unique API key.

20 Claims, 52 Drawing Sheets

(56) References Cited

U.S. PATENT DOCUMENTS

| | | | |
|---|---|---|---|
| 8,332,418 B1* | 12/2012 | Giordani | G06Q 50/01 |
| | | | 707/758 |
| 8,556,630 B2 | 10/2013 | Hackett | |
| 2002/0029162 A1 | 3/2002 | Mascarenhas | |
| 2003/0036043 A1* | 2/2003 | Sullivan | A61B 5/167 |
| | | | 434/236 |
| 2006/0073451 A1* | 4/2006 | Thornley | G09B 7/02 |
| | | | 434/236 |
| 2006/0205564 A1 | 9/2006 | Peterson | |
| 2007/0168501 A1 | 7/2007 | Cobb et al. | |
| 2007/0192106 A1* | 8/2007 | Zilca | G06Q 30/02 |
| | | | 704/270 |
| 2007/0252812 A1* | 11/2007 | Keahey | G06Q 99/00 |
| | | | 345/156 |
| 2008/0044798 A1* | 2/2008 | Furmanski | G09B 19/00 |
| | | | 434/236 |
| 2008/0059474 A1 | 3/2008 | Lim | |
| 2008/0081320 A1* | 4/2008 | Hackett | G09B 7/00 |
| | | | 434/236 |
| 2010/0097193 A1 | 4/2010 | Tang | |
| 2011/0276408 A1 | 11/2011 | Toole | |
| 2012/0290702 A1* | 11/2012 | Vincent | G06F 9/4451 |
| | | | 709/223 |
| 2015/0142839 A1* | 5/2015 | Ochandio | G06Q 50/01 |
| | | | 707/758 |
| 2015/0379888 A1* | 12/2015 | Hill | G09B 7/06 |
| | | | 434/236 |
| 2016/0042282 A1* | 2/2016 | Amini | G06Q 30/02 |
| | | | 706/46 |

* cited by examiner

Login

Have an invite code? Register.

Email

Password

Forgot your password?

[Login]

FIG. 2A

Registration

Already have an account? Login.

Code  TESTCODE

Email  name@domainname.com

[Next >]

FIG. 2B

Invite code accepted! Continue with registration.

Finish Registration

We are about to create a new User account for you under (Group Name)

Continue with the registration of a new User account.

| | |
|---:|---|
| Email | testuser@test.com |
| Confirm Email | |
| Password | |
| Confirm Password | |
| First Name | |
| Last Name | |

[ Complete ]

FIG. 2C

What it means to be GOLD

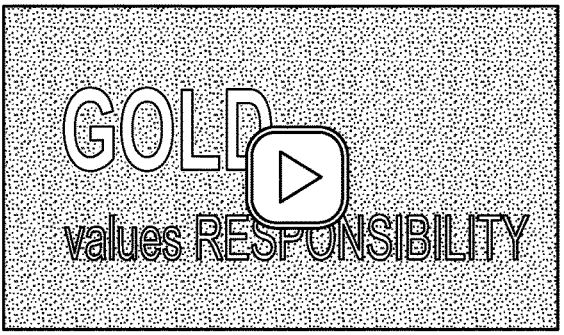

I like to think about how I will accomplish what I have set out to do.

The best way to engage me is to be helpful in following the plan.

I will continue to be an active participant if you stay on-task and cooperate.

I am least likely to respond to abstract ideas that don't adhere to a plan, or what I consider to be ill-mannered behavior such as interrupting, unruliness, or being tardy.

My ideal role is to get things organized or manage established processes.

My greatest everyday stress occurs when others do not follow policies, and when I take on too much work because others do not handle the details well.

FIG. 4D

What it means to be GREEN

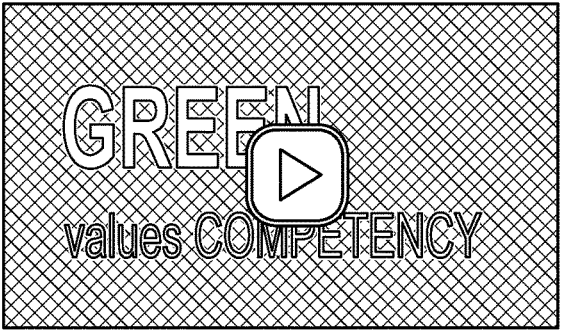

I like to think about how I can learn new things, invent new ways of doing things, or improve existing systems.

The best way to engage me is to ask me about my ideas.

I will continue to be an active participant if you acknowledge my ideas.

I am least likely to respond to pressure to conform, particularly if rules or policies do not make rational sense to me.

My ideal role is to tackle complex or abstract problems and put them in perspective with the big picture.

My greatest everyday stress occurs when I am prevented from thinking my thoughts through, and from moving forward in implementing my ideas.

FIG. 4E

FIG. 5C ( 1 ) LEARN ABOUT THE COLORS ( 2 ) COLOR SORT ( 3 ) WORD SORT ( 4 ) RESULTS

Discovering color in your life

You naturally exhibit your character strengths in a variety of ways, depending on your environment and those around you. For each category of your life (At Work, Home, etc.), read all of the word groups at the top of the columns. Then click the top-most box under the word group that feels most like you. Continue down, clicking the boxes under each word group in the order from most like you at the top to least like you at the bottom. You can clear your choices and re-select if you wish.

AT WORK     0/4

|  | Cooperative Expressive Supportive | Responsible Dutiful Organized | Resourceful Hands-On Flexible | Analytical Innovative Determined |
|---|---|---|---|---|
| MOST LIKE ME | ○ | ○ | ○ | ○ |
|  | ○ | ○ | ○ | ○ |
|  | ○ | ○ | ○ | ○ |
| LEAST LIKE ME | ○ | ○ | ○ | ○ |

HOME/FAMILY     0/4

|  | Preserving Concerned Protective | Cherishing Inspiring Authentic | Intelligent Idealistic Curious | Spontaneous Fun Active |
|---|---|---|---|---|
| MOST LIKE ME | ○ | ○ | ○ | ○ |
|  | ○ | ○ | ○ | ○ |
|  | ○ | ○ | ○ | ○ |
| LEAST LIKE ME | ○ | ○ | ○ | ○ |

FIG. 6A

| WITH FRIENDS | | | | | 0/4 |
|---|---|---|---|---|---|
| | Adventurous Charming Generous | Thoughtful Harmonious Sincere | Learning Teaching Philosophical | Loyal Timely Practical | |
| MOST LIKE ME | O | O | O | O | |
| | O | O | O | O | |
| | O | O | O | O | |
| LEAST LIKE ME | O | O | O | O | |

| MY WORLD-VIEW | | | | | 0/4 |
|---|---|---|---|---|---|
| | Hope Compassion Spirituality | Big-Picture Strategy Individualism | Freedom Change Courage | Safety Necessity Valor | |
| MOST LIKE ME | O | O | O | O | |
| | O | O | O | O | |
| | O | O | O | O | |
| LEAST LIKE ME | O | O | O | O | |

| MY SELF-VIEW | | | | | 0/4 |
|---|---|---|---|---|---|
| | Honorable Caring Traditional | Reserved Original Multi-Faceted | Exciting Impactful Dynamic | Imaginative Loving Kind | |
| MOST LIKE ME | O | O | O | O | |
| | O | O | O | O | |
| | O | O | O | O | |
| LEAST LIKE ME | O | O | O | O | |

```
if (is_null($this->get('blue')) || is_null($this->get('gold')) || is_null($this->get('orange')) || is_null($this->get('green'))) {
$results = array(
'cards' => array(
 $this->get('card1'),
 $this->get('card2'),
 $this->get('card3'),
 $this->get('card4')
),
'words' => array(),
'final' => array()
);
$r = qry('
SELECT
 'atwork_blue', 'atwork_orange', 'atwork_gold', 'atwork_green',
 'homefamily_blue', 'homefamily_orange', 'homefamily_gold', 'homefamily_green',
 'withfriends_blue', 'withfriends_orange', 'withfriends_gold', 'withfriends_green',
 'myworldview_blue', 'myworldview_orange', 'myworldview_gold', 'myworldview_green',
 'myselfview_blue', 'myselfview_orange', 'myselfview_gold', 'myselfview_green',
FROM ' . DB_TBL_PROFILES . '
WHERE 'id' = ' $this->get('id') . '
LIMIT 1
');
if (num($r) && $a = fch($r)) {
 foreach ($a as $field => $value) {
  preg_match('/^(.+)_(.+)$/', $field, $matches);
  if ('isset($results['words'][$matches[1]])) {
   $results['words'][$matches[1]] = array();
  }
  $results['words'][$matches[1]][$matches[2]] = $value;
   arsort($results['words'][$matches[1]]);
  }
 }
}

$tot = 0;
$data = array();
foreach($results['cards'] as $k => $color) {
 $value = 4 - $k;
 foreach($results['words'] as $cat) {
  $value += $cat[$color];
 }
 $tot += $value;
 $data[] = array(
  'value'  => $value,
  'weight' => $k,
  'color'  => $color
 );
}
```

FIG. 7

```
foreach ($data as $key => $row) {
 $values[$key] = $row['value'];
 $weights[$key] = $row['weight'];
} array_multisort($values, SORT_DESC, $weights, SORT_ASC, $data);

$used = 0;
foreach ($data as $info) {
 $percent = round(100 + $info['value'] / $tot);
 if ($percent > 100 - $used) {
  $percent = 100 - $used;
 }
 $used += $percent;
 $results['final'][] = array(
  'color' => $info['color'],
  'value' => $info['value'],
  'percent' => $percent
 );
```

FIG. 7 (Cont.)

| BEING GREEN/ORANGE | COMMUNICATION | CONFLICT & STRESS | CHANGE | ENGAGEMENT | LEADERSHIP | COMPARE |

As a Green/Orange, you naturally think in terms of the big picture and see lots of possibilities. And, given the Blue influence on your thinking, you are likely to be drawn to ideas that involve people as opposed to the processes that will be required to make your vision feasible.

You tend to think abstractly, often with lofty ideals that have far-reaching implications, and you are driven to promote your ideas to engage others in your "grand plan". Your vision and idealistic convictions position you to assume a leadership role. In fact, you are in your element when you are free to evolve your ideas, taking into account new information as you engage previously uncharted situations and/or challenges to your own beliefs.

Big shifts don't happen on their own. You make them happen with your subtle, yet consistent influence on people. While you have a strong need for private time, you often find yourself on center stage where your confidence and enthusiasm for your ideas come through. Your confident demeanor makes it natural for you to engage others who may not initially share your viewpoint. That's the Orange in you. That, coupled with your Blue-ness gives you the intuition to read others' reactions and negotiate your position in a way that relates to their values.

You are genuinely interested in what motivates people. You value relationships and have a strong need to make a meaningful impact. Those who know you well will say that you can be quite driven, while at the same time, attentive to the reactions of others as you seek alignment with the values you promote.

It comes as no surprise to people who know you that Gold is your palest color. You can be quite oblivious to the details and prefer not to get bogged down in the "minutia." This can be very frustrating for those who are faced with keeping order while you continue on your mission. It can also be frustrating to you if the details of implementation interfere with your ability to advance new ideas.

FIG. 8B

| BEING GREEN/ORANGE | COMMUNICATION | CONFLICT & STRESS | CHANGE | ENGAGEMENT | LEADERSHIP | COMPARE |

When I communicate with others I...
- Am purposeful, logical
- Think first
- Hate redundancy
- Am theoretical
- Am big picture
- Ask a lot of questions
- Love to share ideas

When communicating with me, I prefer that you ...
- Don't ask stupid questions
- Give me time to think
- Paint the big picture
- Stick to sound logic
- Watch your vocabulary
- Debate me --- It's fun
- Don't misinterpret my need for information

When communicating, I should ...
- Realize I need to pay attention to people and their feelings, not just their thoughts and ideas
- Consider the details
- Sometimes just listen, without asking questions or try to fix anything
- Not get bogged down in vocabulary

When communicating under stress I can become stubborn, private.

FIG. 8C

| BEING GREEN / ORANGE | COMMUNICATION | CONFLICT & STRESS | CHANGE | ENGAGEMENT | LEADERSHIP | COMPARE |

To avoid conflict with me:
- Provide information
- Realize my emotions are deep
- Give me privacy, independence
- Recognize my work
- Consider my ideas
- Be logical

Tips for dealing with conflict & stress
- Greatest source of interpersonal conflict:
  Too much heart, not enough mind: mindless chatter
- When faced with conflict, I can become:
  Sarcastic, indecisive
- Quickest way to avoid or reduce conflict:
  Present a logical, rational argument: respect my need for independence and privacy

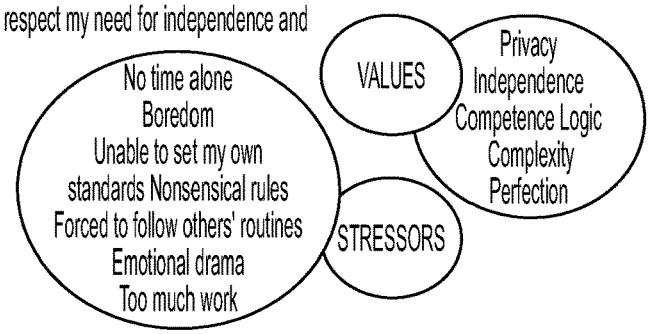

FIG. 8D

| BEING GREEN/ORANGE | COMMUNICATION | CONFLICT & STRESS | CHANGE | ENGAGEMENT | LEADERSHIP | COMPARE |

I will embrace change if it involves...
- New ideas
- Improving systems or inventing new ways of doing something

When going through change:
Give me as much information as possible, as early as possible, about the change to feed my need to ask questions, understand, and be competent.

Engaging me in change:
- Don't like to make a change just to make a change
- Don't bog me down in the minutia
- Keep me focused on the big picture and strategy
- Ask for my ideas and opinions
- Don't expect me to show my emotions and I have trouble when others show theirs

FIG. 8E

| BEING GREEN / ORANGE | COMMUNICATION | CONFLICT & STRESS | CHANGE | ENGAGEMENT | LEADERSHIP | COMPARE |

How to engage me ...
- Respect my ideas
- Challenge my intellect
- Let me choose my projects
- Ask for my opinions, ideas
- Let me update, create things

Realize that I...
- Need time to think
- Don't like small talk
- Don't conform to "just because"
- Don't respond to drama
- Need private space

FIG. 8F

| BEING GREEN / ORANGE | COMMUNICATION | CONFLICT & STRESS | CHANGE | ENGAGEMENT | LEADERSHIP | COMPARE |

As a GREEN leader I value ...
- The big picture
- Intelligence and competence
- Problem solving
- Logic and reason
- Working independently
- Meaningful conversation

I need to ...
- Delegate detail oriented tasks to others
- Share work load with others
- Communicate ideas and feelings with others
- Learn how to develop a greater tolerance fo conflict and others' "feelings"
- Give clear explanations

When giving me input ...
- Help me understand the big picture
- Know what you are talking about
- Focus on the quality of work
- Avoid small talk
- Be objective
- Stay calm

FIG. 8G

My Dashboard

My Information

Test User      Edit      | 21 | 15 | 12 | 12 |   View Results
Email    testuser@test.com
Password   *******
API Key ⓘ   23b48d48fd433bbfc0f70fab33174231    Need help with your account? Technical | Account

— 900

Your Visible Information

Email   testuser@test.com

910 — | Groups | Users |

Click a name to view user information or a color spectrum to view profile details.

Search: [          ]       Show [100 ▼]

| ▲ Name | ◆ Email | Profile Status |
|---|---|---|
| Lisa Yankowitz | lisa@samplecorp.com | 24 | 18 | 12 | 6 |
| Test User | testuser@test.com | 21 | 15 | 12 | 2 |

915 —     905

Showing 1 to 2 of 2 Users.

FIG. 9

Successfully created group New Group - TKL4.

Manage Group

Name your group and save to start adding members.

Name: New Group - TKL4            Cancel

Permissions

⦿ Private  ○ Group  ○ Account

Group is visible only to you and Administrators.

Total Group Members 0     Update

Delete Groups ✖

First Colors

At least one member of the Group must have a completed profile in order to get to see a chart.

| Groups Members | Groups |

Search:

◆ Name  ◆ Email  Profile Status  Scores

No data available in table

Showing 0 to 0 of 0 entries     Show [100 ▼]

FIG. 10A

Add/Remove Members to/from Accounting

[Save] [Reset]

Click on users on the left to add them to the group. Click on users on the right to remove them from the group.

Account Users Show/Hide: First | Last | Email | Profile

Search: [____]

| ▲First Name | ⇔Last Name | ⇔Email | Profile |
|---|---|---|---|
| Andrew | Shead | andrew@... | ○○○○ |
| Frank | Peddler | Frank@sa... | ●○○○ |
| Harold | Jones | Harold@s... | ●●○○ |
| Ida | Wright | Ida@sam... | ●●●○ |
| Jenny | Brewer | Jenny@s... | ●●●● |
| Jimmy | Carpenter | Jimmy@s... | ●●○○ |
| John | Dough | John@sa... | ●●○○ |
| Kristin | Burnette | Kburnet5... | ○○○○ |
| Lisa | Thomas | lisa@thom... | ○○○○ |
| Liz | Rowland | lrowland... | ○○○○ |
| Mason | Johnson | Mason@s... | ●●○○ |

Group Members Show/Hide: First | Last | Email | Profile

Search: [____]

| ▲First Name | ⇔Last Name | ⇔Email | Profile |
|---|---|---|---|
| Andy | Dufresne | Andy@sa... | ○○○○ |
| Betty | Deeling | Betty@sa... | ●○○○ |
| Bob | Hill | bob@sam... | ●●○○ |
| Carol | Jones | carol.jone... | ●●●○ |
| Charles | Kane | Charles@... | ●●●● |
| David | Wright | David@sa... | ●●○○ |
| Don | Tesla | Don@sam... | ●●○○ |
| Genny | Mackey | gmackey... | ○○○○ |
| Jason | Gordon | jgordon@... | ○○○○ |
| Nick | Counter | Nick@sa... | ●○○○ |

Manage Group

Accounting
Owner: Andrew Shead
Q4RF ⓘ
This Group is Shared with Account Members      Edit Add/Remove Group Members Total Group Members  8
Download Group Results
Delete Group ✖

First Colors 58.0%
21.0%
21.0%
— 1100

Scores

— 1105

— 1115

Group Members

Search: [          ]
                                                                    Show [10 ▼]

| ▲Name | ◆ Email | Profile Status |
|---|---|---|
| Andy Dufresne | Andy@samplecorp.dev | 24 : 18 : 12 : 6 |
| Carol Jones | Carol.jones@samplecorp.dev | 24 : 18 : 10 : 8 |
| Charles Kane | Charles@samplecorp.dev | 22 : 20 : 10 : 8 |
| David Wright | David@samplecorp.dev | 21 : 13 : 13 : 13 |
| Genny Mackey | gmackey@samplecorp.dev | 21 : 14 : 11 : 10 |

| Invited and Pending Users | Completed Users | | | |
|---|---|---|---|---|
| Search: | | | | Show 10 |
| ▲Name | ⇵Email | ⇵Facilitator/Code | ⇵Status | |
| Jason Gordon | jgordon@samplecorp.com | Bob Hill/GGRY1X | 0 | UnInvite Resend Invite |
| Lisa Thomas | lisa@samplecorp.com | Bob Hill/GGRY1X | 0 | UnInvite Resend Invite |
| Liz Rowland | lrowland@samplecorp.com | ShirleyHill/5TCV9Q | 0 | UnInvite Resend Invite |
| Robet Hill | bhill@samplecorp.com | Bob Hill/GGRY 1X | 0 | UnInvite Resend Invite |
| Sarah Cooper Cooper | scooper@samplecorp.com | Bob Hill/GGRY 1X | 0 | UnInvite Resend Invite |

FIG. 12B

| Invited and Pending Users | Completed Users | | | |
|---|---|---|---|---|
| Search: | | | | Show 10 |
| ▲Name | ⇵Email | ⇵Facilitator/Code | ⇵Status | |
| Andrew Shead | ashead@samplecorp.com | From another Account | 1 | Remove from Account |
| Andy Dufresne | Andy@samplecorp.dev | David Wright/2JB73R | 1 | Remove from Account |
| Betty Deeling | Betty@samplecorp.dev | David Wright/2JB73R | 1 | Remove from Account |
| Bob Hill | bhill@samplecorp.com | David Wright/2JB73R | 1 | Cannot remove Admins |
| Carol Jones | carol.jones@samplecorp.com | Bob Hill/JXT96N | 1 | Remove from Account |
| Charles Kane | Charles@samplecorp.com | David Wright/2JB73R | 1 | Remove from Account |
| David Wright | dwright@samplecorp.com | From another Account | 1 | Cannot remove Admins |
| Don Tesla | bhill@samplecorp.dev | David Wright/2JB73R | 1 | Remove from Account |
| Frank Peddler | Frank@samplecorp.dev | David Wright/2JB73R | 1 | Remove from Account |
| Genny Mackey | gmackey@samplecorp.com | From another Account | 1 | Cannot remove Admins |

Showing 1 to 10 of 27 entries

| Completed Users | Invite Log | | | | | | |
|---|---|---|---|---|---|---|---|
| Search: [    ] | | Key | Active | Used (Profile Incomplete) | Used (Profile Complete) | Cancelled | |
| | | Uninvite Selected | Send Email Reminder to Selected | Remove Selected from Account | | | |
| All | ⇕First | ⇕Last | ⇕Email | ⇕From | ⇕Code | ⇕Email | ⇕Latest | ▼Invited |
| ☐ | Frank | Peddler | Frank@samplecorp.dev | | JM4Q8G | - | - | 10/31/2013 |
| ☐ | Betty | Deeling | Betty@samplecorp.dev | | JM4Q8G | - | - | 10/31/2013 |
| ☐ | Andy | Dufresne | Andy@samplecorp.dev | | JM4Q8G | - | - | 10/31/2013 |
| | Roger | Jordan | Roger@samplecorp.dev | | KB4W41 | - | - | 05/10/2013 |
| ☐ | Jerry | Gordon | Jerry@samplecorp.dev | | KB4W41 | - | - | 05/10/2013 |
| | Tammy | Hill | Tammy@samplecorp.dev | | JM4Q8G | - | - | 05/10/2013 |
| | [First] | [Last] | [Email] | [From] | [Code] | [Status▼] | [Latest] | [Invited] |

Showing 1 to 6 of 6 invites

Send Invitations

② ①

First Name | Last Name | Email Address*

Group

○ Add to an existing group — Choose a group ▼
○ Create a new Group — Enter a Name
● No group

[Upload List] [Customize Message]

[SEND]

Upload a List

If you have a CSV export from Google Contacts or Outlook Contacts you can upload those here.

- The CSV should be seperated by commas.
- Individual cells should NOT have quotes around them.
- View Samples and Detailed Instructions.

[Choose File] No file chosen   [Import]

③

Send Invitations   [Upload List] [Return to Invites]

Subject: You've been invited by {$YourName} to {$host}

Message:

{$YourName} has invited you to take an Ntrinsx assessment for {$AccountName}.

Link:

To get started, click on the link below or copy and paste it into your web browser's address bar.
{$host}/Portal/invite/?i={$invite}

Footer:

For additional information or help, please contact your Facilitator.
{$YourName}
{$YourEmail}
Sincerely,
Ntrinsx

Blue Special Message

| □ | B | I | U | ABC | | ≡ | ≡ | ≡ | ≡ | | Paragraph ▼ | Font family ▼ | | Font size ▼ |
|---|---|---|---|---|---|---|---|---|---|---|---|---|---|---|

You selected Blue as your first color, which tells me a lot about your ***** values. But, you have all four colors in you. Register below to learn more about temperament and cloud-based Social Intelligence Path: p

No color Special Message

| □ | B | I | U | ABC | | ≡ | ≡ | ≡ | ≡ | | Paragraph ▼ | Font family ▼ | | Font size ▼ |
|---|---|---|---|---|---|---|---|---|---|---|---|---|---|---|

Regular below to learn more about temperament and cloud-based Social Intelligence Path: p

[ Manage offer ]

FIG. 16H (Cont.)

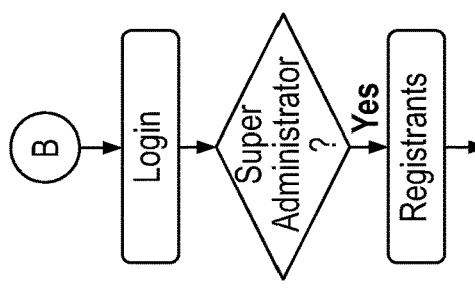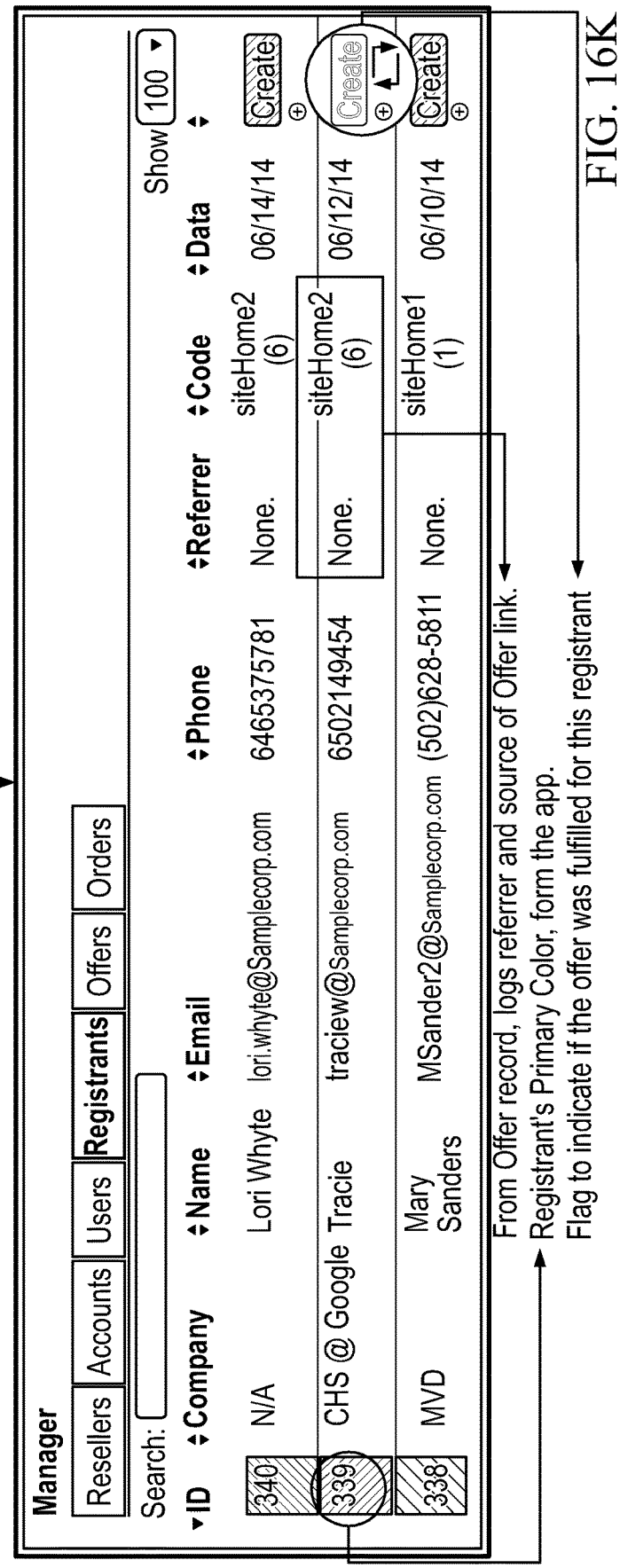
FIG. 16K

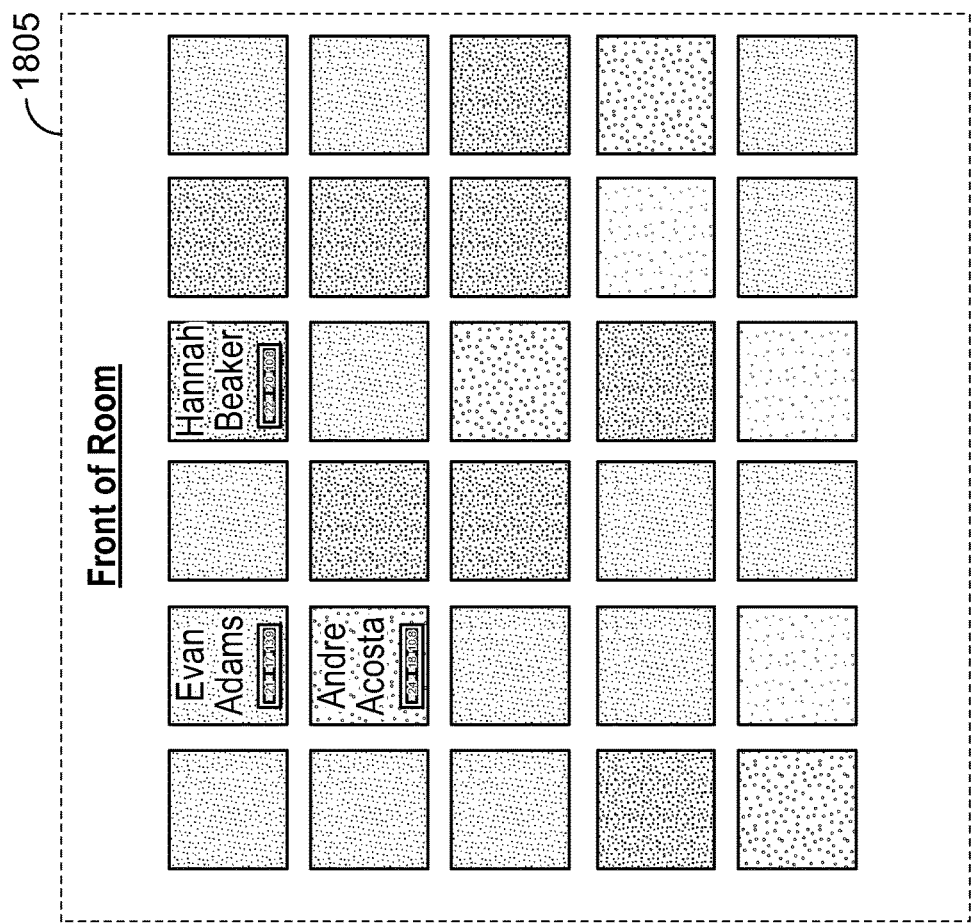
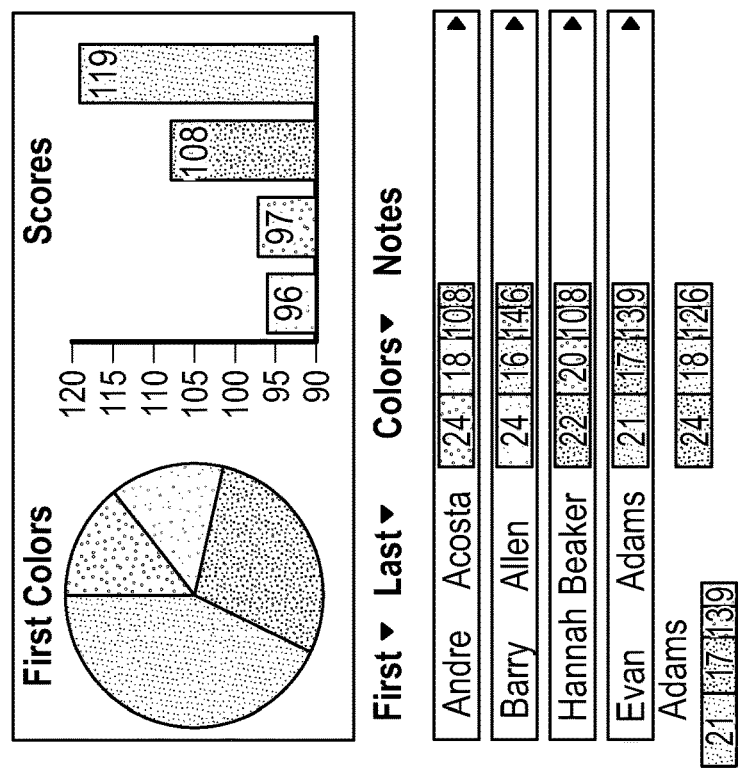
FIG. 18A (Cont.)

ONLINE PERSONALITY TESTING PROVIDING INDIVIDUAL CONTEXTUAL ASSESSMENTS IN A SECURE INTEGRATED ENVIRONMENT

CROSS REFERENCE TO RELATED APPLICATIONS

This application is a continuation of U.S. patent application Ser. No. 14/318,553, filed Jun. 27, 2014, the entire contents and disclosure of which are hereby incorporated by reference herein in their entirety.

BACKGROUND OF THE INVENTION

Primitive forms of personality testing date back to the 18th-19th century, where practitioners would assess a person's personality by the pseudoscientific methods of phrenology (measuring the person's skull) and physiognomy (assessing personality based on the person's outward appearance). Over time, personality testing evolved to include more empirical data, rather than superficial, surface characteristics of the person. For example, the Woolworth Personal Data Sheet was developed in 1919 to enable the U.S. Army to screen out individual recruits/draftees that might be susceptible to shell shock while in combat conditions. This test included a self-report inventory, whereby the person answered direct questions about behaviors, symptoms, characteristics, and traits associated with mental disorder(s). These direct answers allowed a test administrator to assess and/or determine whether the person was mentally ill or showing characteristics of potential mental illness. However, a person taking a self-report inventory can easily manipulate the outcome of the test, by denying certain behaviors, providing inaccurate answers regarding severity and frequency, or exaggerating severity and frequency. Furthermore, the self-report inventory provided no context for the test result. In other words, there were no indications if the result was valid in high stress, non-combat environments.

In 1921, psychologist Carl Jung published his book "Psychological Types", where he presented his typological model of human psychological types. Jung theorized that there are four principal psychological functions by which people experience the world: sensation, intuition, feeling, and thinking. According to Jung, one of these four functions is dominant most of the time. Based on Jung's writings, Katharine Briggs and Isabel Myers began creating their personality questionnaire during World War II to help women identify industrial labor jobs for which they would be best suited. The questionnaire developed into the Myers-Briggs Type Indicator ("MBTI"), which was published in 1962. While the MBTI proved to be popular, it suffers from the same issues of the early self-reporting inventories—the person being tested could easily manipulate the outcome and the results did not contemplate or account for different contextual settings.

Additional tests have been developed since the MBTI, with a significant number relying on extensive questionnaires to determine personality traits, temperament, etc. Generally speaking, a significant number of these test failed to account for context as well. In the 1980s, David Keirsey and Marilyn Bates developed a personality inventory based on the MBTI, whereby the sixteen MBTI personality types were placed into four groups, each group being associated with four temperaments: rational, idealist, artisan, and guardian. Additional refinements to this personality inventory associated a color with each of the four temperaments. This assignment of colors did little to advance the accuracy of personality testing, as the color was merely a proxy for one of the four temperaments. Furthermore, the person's "dominant" color controlled and the "order" of the remaining colors did not impart any significant meaning. In other words, there was no significant difference between being "Gold, Blue, Green, Orange" (GBGrO) and "Gold, Blue, Orange, Green" (GBOGr) in various contextual settings.

As a result of these shortcomings, personality testing has generally failed to account for different contextual settings that the test taker finds themselves in, e.g., a person may exhibit certain traits and behaviors at home, while exhibiting significantly different traits and behaviors while at work. These personality tests also fail to provide information to the test taker regarding how to best interact with others in those different contextual settings, e.g., how to work effectively with a "OGrBG" person when the test taker is "GBGrO", and how that changes in a social setting.

Despite advances in today's computing technology and Internet connectivity, current personality testing methodologies still fail to account for contextual settings when assessing personality and, therefore, cannot provide guidance to the test taker on how to best interact with others in those contextual settings. At best, modern technology has moved the long-form, tedious, and easily-manipulated questionnaires from paper onto a computer screen without adding significant benefits to the test takers or those administering the tests.

SUMMARY

The following presents a simplified summary in order to provide a basic understanding of some aspects of the invention. This summary is not an extensive overview. It is not intended to identify key or critical elements of the invention or to delineate the scope of the invention. The following summary merely presents some concepts of the invention in a simplified form as a prelude to the more detailed description provided below.

According to aspects of the present invention, a computerized method executed by a centralized computing device assesses one or more personality characteristics of a registered user. The method includes, among other things, providing, by the centralized computing device, a first user interface to the user, with the first user interface including at least two color elements for a first user selection, with the first user selection being indicative of a sort order of the color elements. The method also include receiving, by the centralized computing device, the first user selection, and providing a second user interface to the user. The second user interface includes at least one word grouping for a second user selection, each word grouping having an associated life context, with the second user selection being indicative of a sort order of the word groupings elements. The method further includes receiving, by the centralized computing device, the second user selection and determining a contextual assessment based on the received first user selection and the received second user selection, with the assessment being weighted on the basis of the received first user selection. The method also include providing, by the centralized computing, a third user interface to the user, with the third user interface displaying the determined assessment based on a predetermined life context.

According to other aspects, a system provides a temperament assessment service executing on a server to users via a network. The system includes, among other things, a first computing device for publishing an application programming interface (API) for accessing the temperament assessment service. The system further includes a database accessible via the network, with the database being configured for storing data related to one or more user profiles for each of the users. The database is further configured to store data related to one or more service accounts. Each of the users is associated with at least one of the service accounts, and the user profiles each include a unique (API) key. An executing computer application may then access the temperament assessment service executing on the server via the published API with one or more of the unique API keys.

According to other aspects, a computer-readable storage media has stored thereon one or more computer-processor executable instructions for assessing one or more personality characteristics of a user. The instructions include instructions for, among other things, providing, by the centralized computing device, a first user interface to the user, with the first user interface including at least two color elements for a first user selection. The first user selection is indicative of a sort order of the color elements. The instructions further include instructions for receiving, by the centralized computing device, the first user selection and providing a second user interface to the user. The second user interface includes at least one word grouping for a second user selection, each word grouping having an associated life context, with the second user selection being indicative of a sort order of said word groupings elements. The instructions also include instructions for receiving, by the centralized computing device, the second user selection, and determining a contextual assessment based on the received first user selection and the received second user selection, with the assessment being weighted on the basis of the received first user selection.

Previously, assessments have been paper-based and implemented in-person, resulting in a resource- and cost-intensive process, that was restrictive in terms of the number of people who can be serviced in a reasonable period of time. Accordingly, some embodiments of the present invention include cloud-based methods and systems that can advantageously be deployed to very large populations in a fast and/or economical manner. Furthermore, aspects of the present invention provide assessments that are contextual with the test subject's life, e.g. at work, home/family, with friends, etc., as people behave differently at work versus at home or with friends, whereas previous methods generally provide a single, narrow view of a person's personality or temperament, which is often misleading can lead to misunderstanding and conflict. Since people are complex and possess a combination of traits, aspects of the present invention attempt to characterize people differently based on the order of prevalence of those traits. Previous systems generally focus on the most predominant trait to the near exclusion of the others, which can be misleading, as two people who share the same predominant trait but have different secondary traits behave differently and have different values.

According to aspects of the present invention, a published application programming interface (API) is provided to allow for easy integration into existing computerized systems and to enable access to the methods and systems described throughout via a mobile device and/or mobile application. Previous systems, being primarily paper-based, lack the ability to integrate with computer applications and systems via API or provide a mobile device experience.

BRIEF DESCRIPTION OF THE DRAWINGS

A more complete understanding of aspects of the present invention and the advantages thereof may be acquired by referring to the following description in consideration of the accompanying drawings, in which like reference numbers indicate like features, and wherein:

FIGS. 2A and 2B illustrates exemplary user login and registration user interfaces, respectively, of an exemplary personal assessment service according to various aspects described herein. FIG. 2C illustrates an exemplary user registration form of an exemplary personal assessment service according to various aspects described herein.

FIGS. 4A-4E illustrate exemplary informational screens of an exemplary personal assessment service, wherein the informational screen present information regarding personality traits, characteristics, etc., associated with each of the displayed colors, according to various aspects described herein.

FIGS. 5A-5C illustrate an exemplary process whereby a user of the exemplary personal assessment service sorts the displayed colors in order of predominance of the traits associated with each color, according to various aspects described herein.

FIGS. 6A-6C illustrate an exemplary process whereby the user of the exemplary personal assessment service completes a "word sort" by ranking word groupings on the provided scale, according to various aspects described herein.

FIG. 7 illustrates an exemplary algorithm, in the form of computer-executable instructions, for determining a computerized "whole person" contextual assessment ("WPCA") on the basis of the user's selections, according to various aspects described herein.

FIGS. 8A-8H illustrate an exemplary determined WPCA as a personal color profile and additional supporting information associated with the personal color profile according to various aspects described herein.

FIG. 9 illustrates another exemplary user information screen, similar to those illustrated in FIGS. 2A and 2B, after the user has completed an assessment, according to various aspects described herein.

FIGS. 10A and 10B illustrate an exemplary group management user interface according to various aspects described herein.

FIGS. 11A and 11B illustrate an exemplary group management user interface, wherein FIG. 11B additionally displays an "at work" context for each users' personal color profile bar, according to various aspects described herein.

FIGS. 12A-12D illustrate exemplary account information maintenance user interfaces, whereby account administrators may, among other things, invite new users to join the account and modify user status, e.g., user, facilitator, etc., of existing users, according to various aspects described herein.

FIGS. 13A and 13B illustrate an exemplary invitation process according to various aspects described herein.

FIG. 14 illustrates another exemplary user information screen identifying the user's unique application programming interface ("API") key.

FIGS. 16A-16K illustrate exemplary flowcharts and diagrams related to super-administrator "manager" functionality according to various aspects described herein.

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Figure 1:
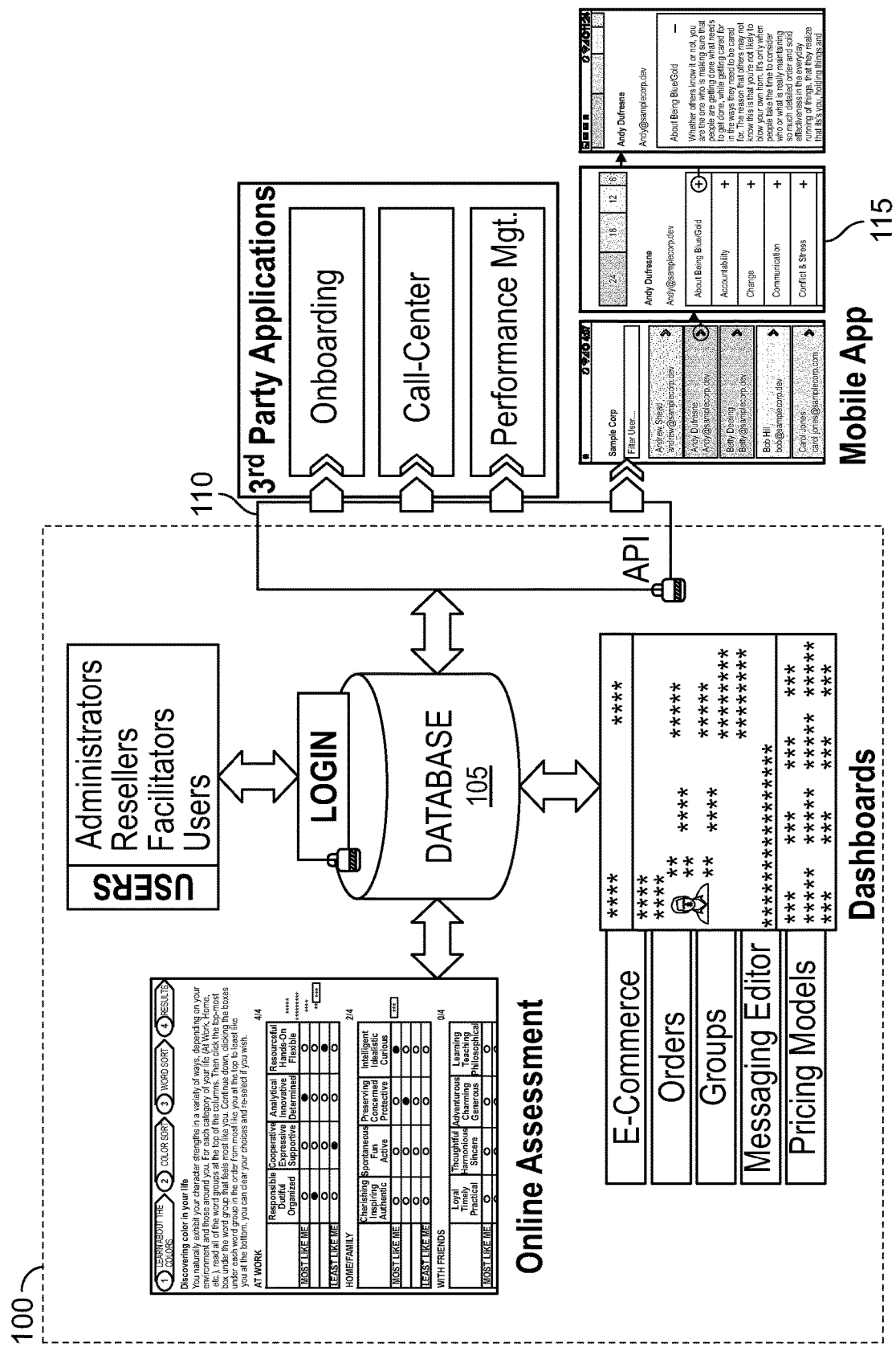
FIG. 1 illustrates a diagram of an exemplary personal assessment service according to various aspects described herein.

Aspects of the present invention provide computerized methods and systems for assessing personality characteristics of a test subject based on, among other things, the subject's self-selection of personality traits and/or the subject's responses to a collection of questions regarding color ordering and word group ordering, each designed to identify attributes of the subject's personality. While the self-selection of traits is an important part of the subject's overall composite assessment, the subject's ability to skew or otherwise intentionally alter the assessment can be minimized by using, among other things, the subject's responses to the collection of questions allows for a more subtle and nuanced way of generating the subject's composite assessment. FIG. 1 illustrates an exemplary embodiment of a personality assessment service 100 ("PAS") according to aspects of the invention. The PAS 100 described below advantageously provides an enjoyable and easy-to-complete experience, as opposed to previous systems' time consuming and laborious test-taking process.

By way of example and not limitation, the following describes an exemplary process according to aspects of the invention, whereby a user accesses a PAS webpage to create an account and/or log into their account, and then perform functions as permitted by the PAS. The PAS may limit access to various functionality based on, but not limited to, the user type, group membership, or security parameters. The user type may include designations, such as administrator, facilitator, user, etc., or other types as determined by the PAS operator or other appropriate person/entity. For the purposes of this example, a PAS operator maintains and operates various aspects of a personality assessment service(s) on one or more servers that are accessible to the users via a network. For example, a PAS operator may operate the service(s) as a 3rd party service provider, while still maintaining the capability to interact with the PAS as an administrator, facilitator, user, etc.

A user with an existing account logs into their account by providing requested identifying information. In FIG. 2A, the exemplary login screen requests an email address and the password associated with the user's account. According to aspects of the present invention, the PAS may utilize other means of user authentication, such as, but not limited to, SecureID or two-factor authentication. The PAS authenticates the user based on user/account information stored in the database 105. Upon successful user authentication, the PAS presents one or more user-appropriate functions to the user as described above, an example of which is illustrated in FIG. 3A. For example, the user account may be an administrator account, whereby administrative level functionality is displayed to the user, such as, but not limited to, reporting, creating invitations, and/or billing. One of ordinary skill in the art will recognize that an administrator account may be created in a number of ways, for example, programmatically assigned to the first user of the account, manually or programmatically established by the operator, etc.

If the user does not have an existing account or desires to create a new account, PAS provides a registration screen to the user, such as the exemplary screen illustrated in FIG. 2B. In the example shown in FIG. 2B, the user enters an invitation (or alternately "invite") code and the user's email address for registration. For the purposes of this illustration, the PAS requires entry of an invitation code to monitor and/or control user profile creation. For example, the PAS operator may charge for PAS usage based on volume or the operator may charge based on a pre-determined number of user sign-ups, e.g., the operator may charge an organization a fixed amount for a certain number of invitation codes for its employees, but discount the amount for volume, e.g., $1000 for the 50 invitation codes, $500 for the next 25 invitation codes, etc. Each invitation code is associated with a particular account, e.g., an account for XYZ Corporation may have invitations codes for each of its 100 employees and, upon registration, each employee user profile is associated with the employer's account. Invitation codes may optionally also allow for source tracking, e.g., web-based referral versus trade show referral; account maintenance, e.g., to resend invitations, remove users from the account, change user privilege level, etc. Users with administrator privileges or designated facilitator privileges can send invitations to email recipients, whereby each email contains an invitation code or an invitation link for joining the sender's PAS account or a particular grouping of users in the sender's PAS account. This process of sending and subsequent tracking of invitations is further discussed below.

Returning to FIG. 2B, the user enters an invitation code and an email address to register. If the user enters an invalid code, i.e., the code-as-entered does not exist or is no longer valid, the user receives a notification that the code is not valid (not shown). An invitation code may no longer be valid for any number of reasons, including but not limited to, exceeding a period of non-use, already having been used for registration, or exceeding a maximum number of registrations. If the user enters an email address that is already in use, the user receives a notification that the user must use an invitation to be added to additional existing accounts (not shown). Once the user has entered a valid invitation code and email address, the user proceeds to a user registration screen, as demonstrated in FIG. 2C. The user then proceeds with entering the requested information, including any fields designed as required, and then indicating completion of the user registration form. Upon completion, the user information is selectively stored in the database 105, e.g., the user profile, and the PAS displays the user information page to the user, as illustrated in FIG. 3A.

Figure 3A:
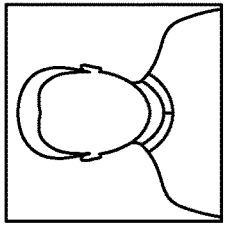
FIGS. 3A and 3B illustrate exemplary user information screens for a registered user of an exemplary personal assessment service according to various aspects described herein.
Figure 3B:
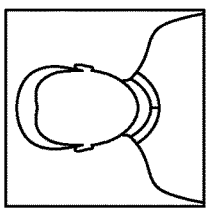

FIG. 3A illustrates an exemplary user information screen, which is designated "My Dashboard" in this example. One of ordinary skill in the art realizes, however, that this labeling is essentially cosmetic and does not limit the scope of the invention. This "dashboard" view provides the user with the ability to edit the information initially entered during the user registration process, an example of which is shown in FIG. 3B. For example, the user can edit, among other things, the ability for other users associated with account to see their Color Profile, if this functionality has been enabled by an account administrator (or by a user with appropriate security privileges). Any updated user information is stored in the database 105. If the logged-in user has completed an assessment, the PAS selectively displays the user's Color Profile results from the user's assessment based on data stored in the database 105. The assessment process is described below. If enabled by an administrator (or by a user with appropriate security privileges), the "Groups" and "Users" tabs in FIG. 3B provide additional functionality, as described herein.

Figure 4A:
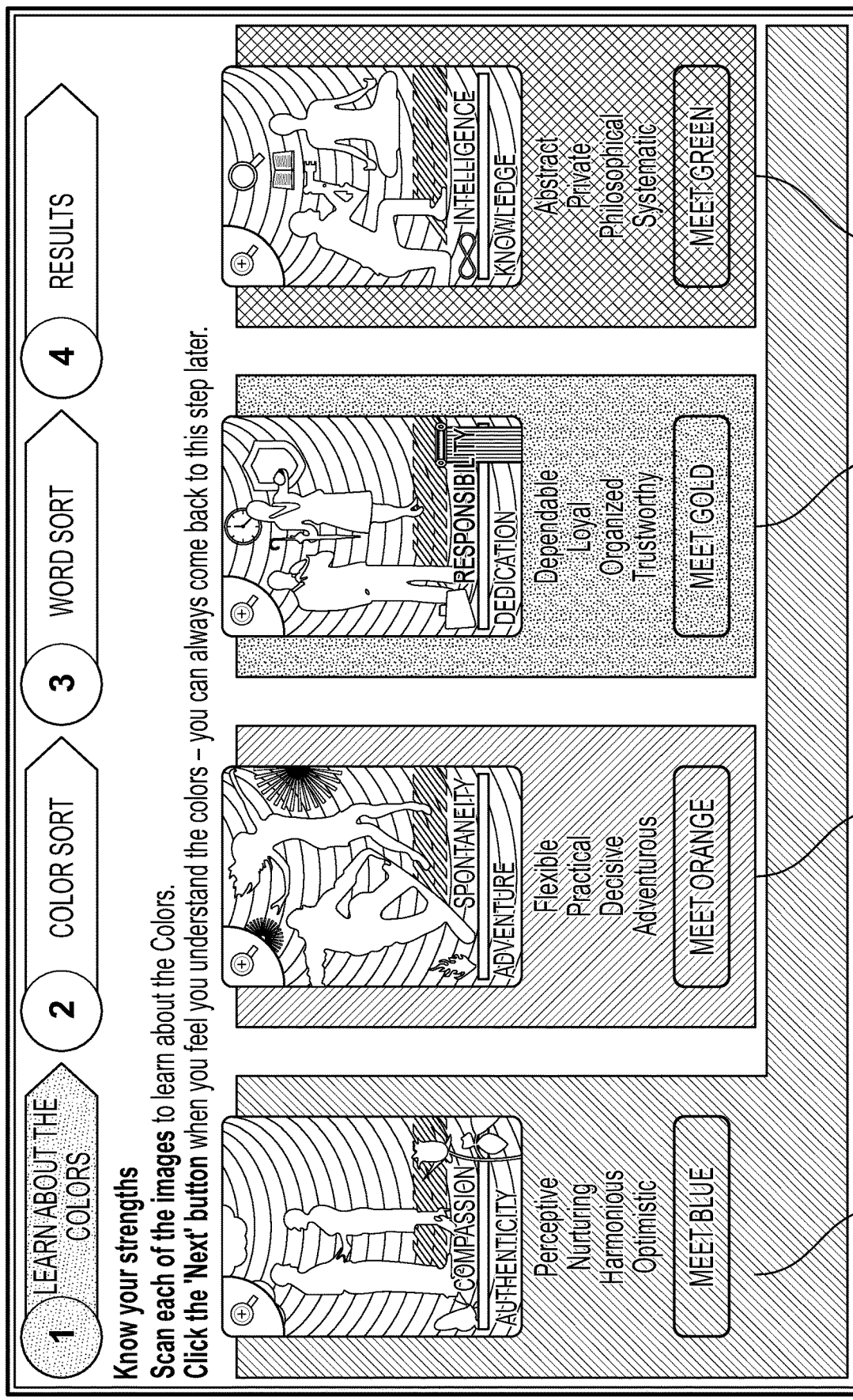
Figure 4B:
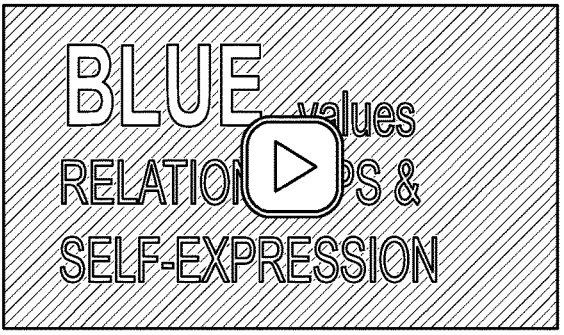
Figure 4C:
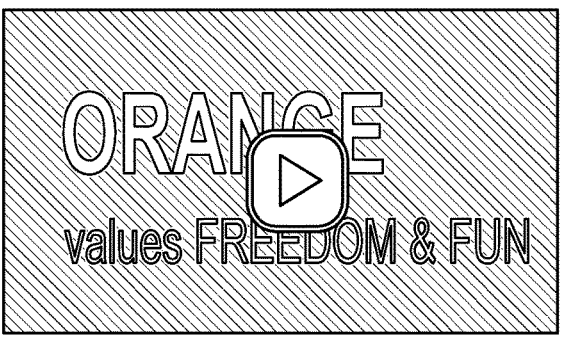

The user may select to take the assessment via the information dashboard screen 300 if the user has not yet completed their personality assessment, as demonstrated at element 305. While the selection element at 300 is illustrated with a button graphic, any suitable selection mechanism may be used for the user to indicate their select. Upon receiving the user's selection to take the assessment, the PAS presents a selection interface to the user, an example of which is illustrated in FIG. 4A. In this example, the user is presented with a selection of four color panels from which the user can select a particular color and learn about the attributes, e.g., traits, characteristics, mannerisms, etc., associated with that color. For example, if the user selects "Blue", as illustrated at 400, informational elements are displayed to the user related to that color, an example of which is shown in FIG. 4B. Exemplary informational elements for Orange 405, Gold 410, and Green 415, are respectively illustrated in FIGS. 4C, 4D, and 4E. It should be noted, however, that while selection interface in FIG. 4A utilizes four colors, any number of colors and associated attributes may be utilized without departing from the scope of invention.

Figure 5A:
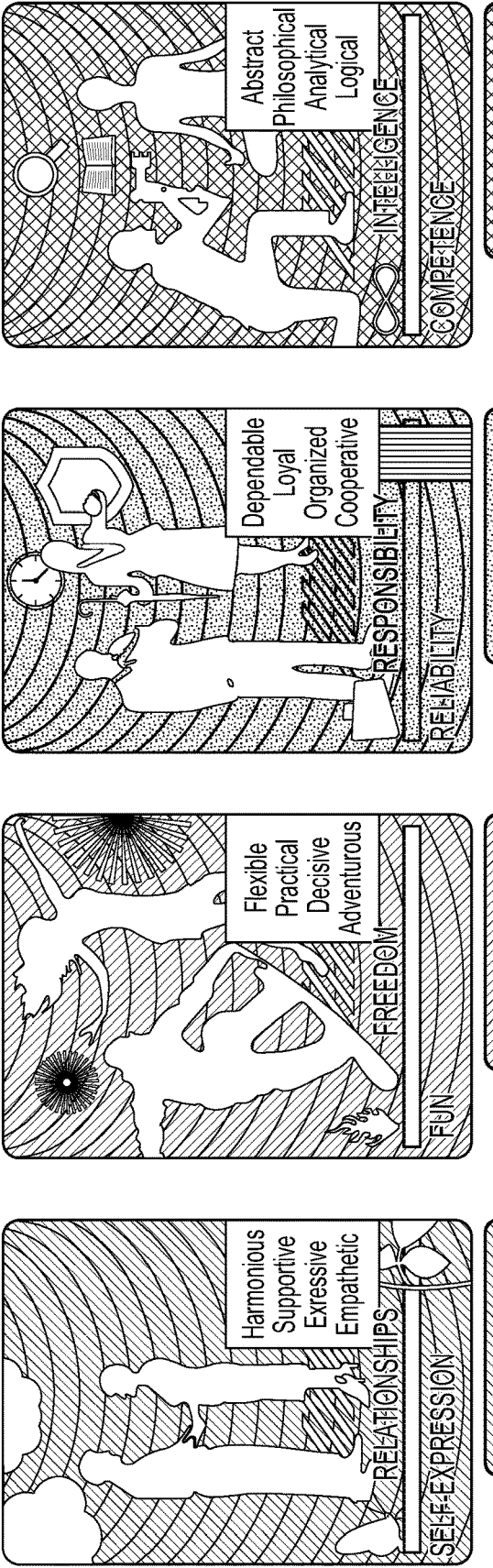
Figure 5B:
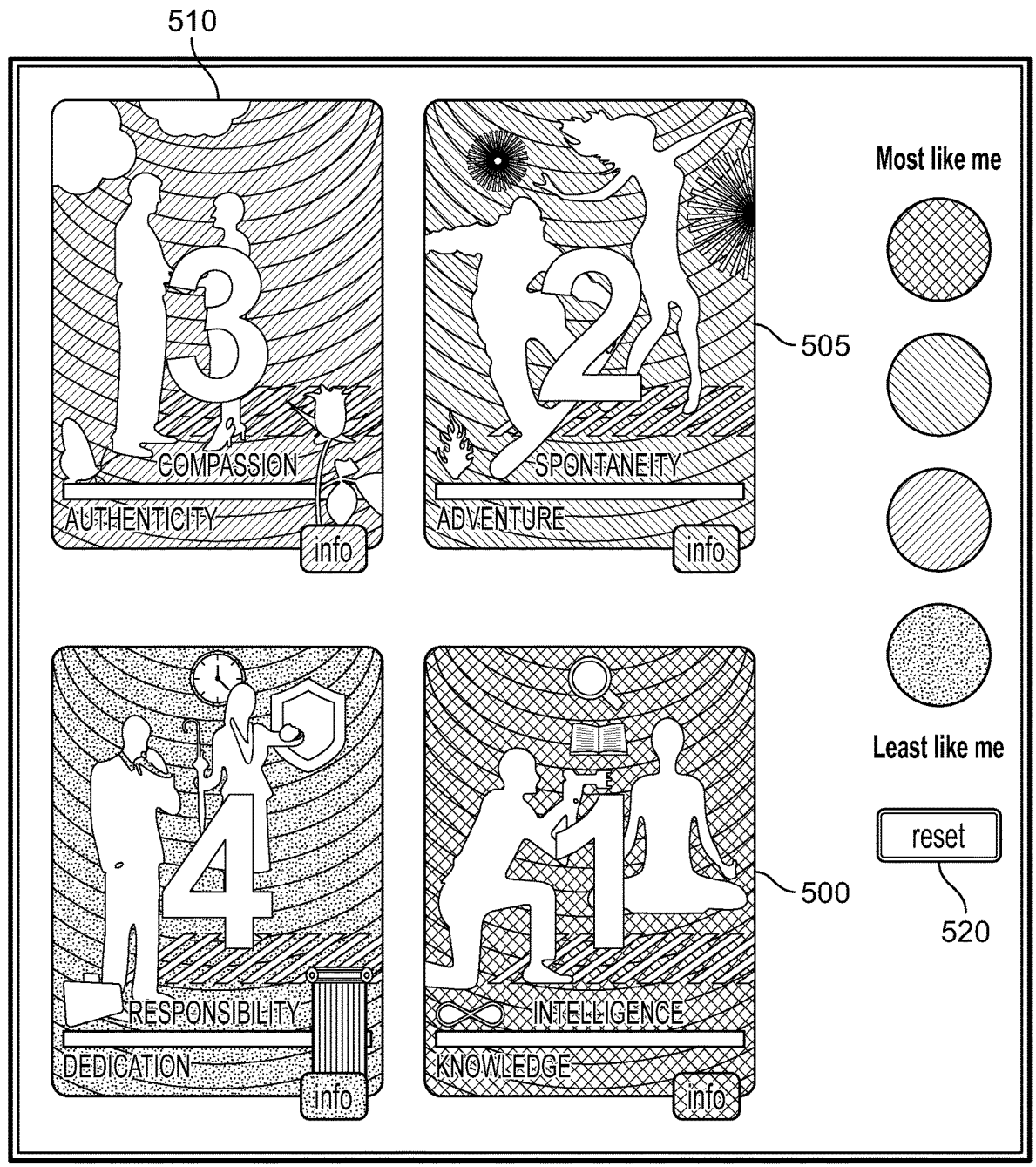
Figure 5C:
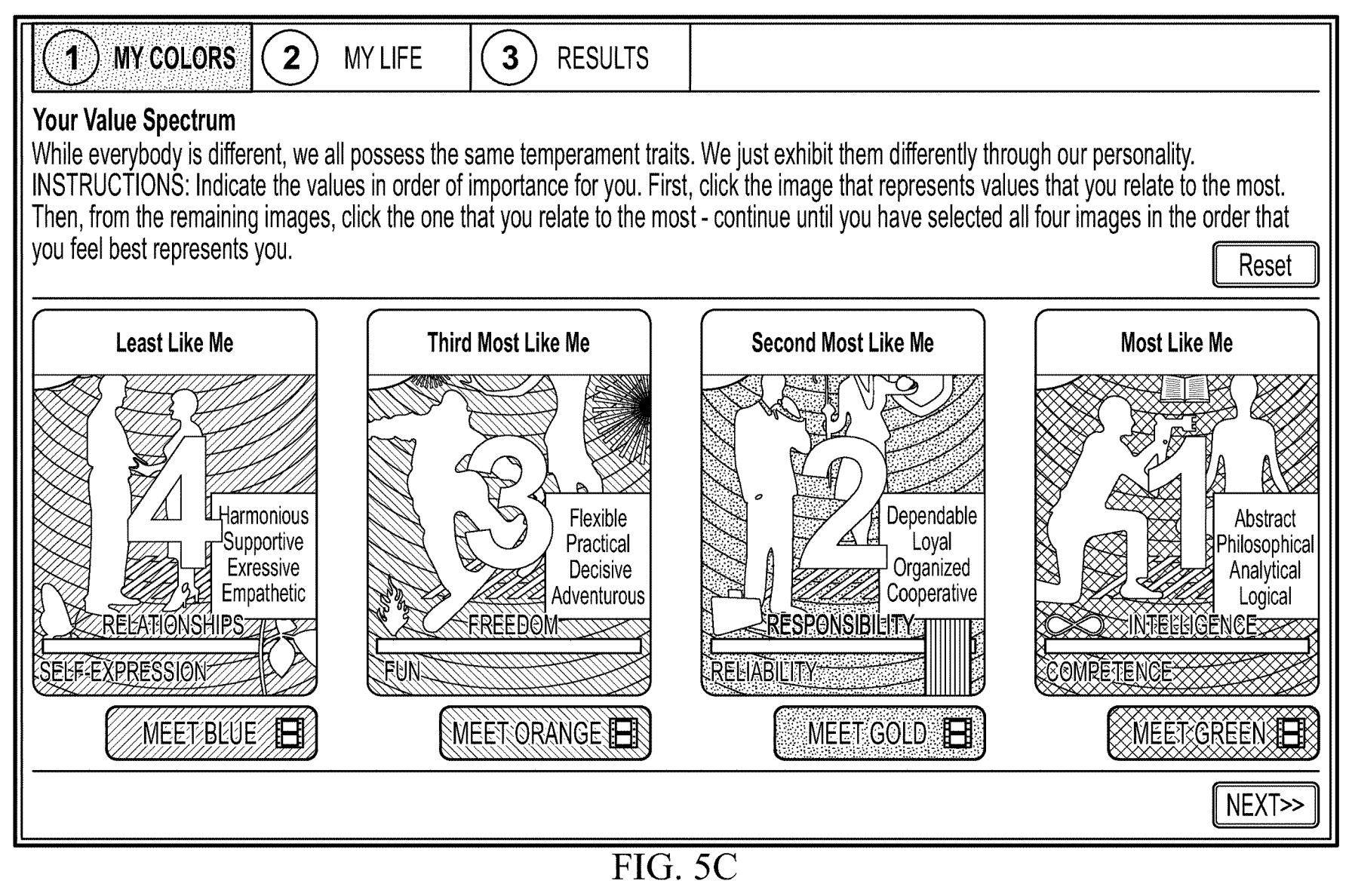

Once the user becomes familiar with the attributes associated with each color, the user proceeds to define their "color spectrum". An example of an exemplary selection process is illustrated in FIG. 5A. In this example, the user clicks on each image in the order of "most like me" to "least like me", i.e., a "color sort". For example, the user may select the colors in the order "Green" 500, "Orange" 505, "Blue" 510, and "Gold" 515, as demonstrated in FIG. 5B. If need, the user may reset and clear out their selection by selecting the "reset" button 520. FIG. 5C demonstrates another exemplary selection user interface. It should be noted, however, other visual configuration of the user interface(s) are clearly within the scope of the present invention.

Figure 6C:
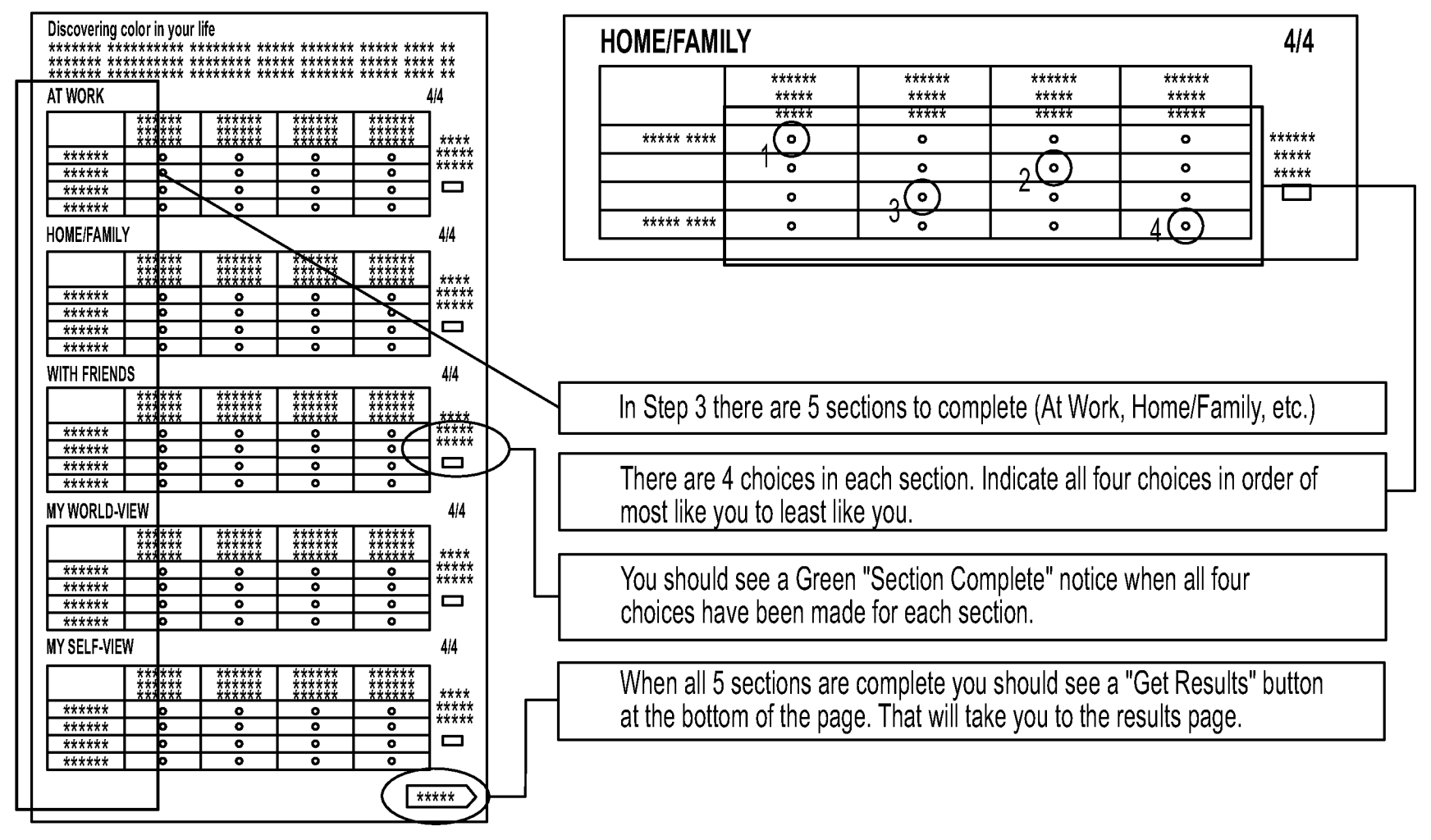

Once the user is satisfied with their selection order, the user's "color sort" selections are saved to the database 105, and the user then proceeds with a "word sort" selection process to selective scale which word groups are "most like me" to "least like me", as illustrated in FIGS. 6A and 6B. Each of the displayed word groups correspond to characteristics associated with each of the colors. For example, the "At Work" section demonstrated in FIG. 6A may have columns ordered, from left to right, with "Blue" characteristics in the first column, "Gold" characteristics in the second column, "Orange" characteristics in the third column, and "Green" characteristics in the fourth column. This ordering, however, is merely one ordering example and other orderings are clearly within the scope of the present invention. In this example, the "Home/Family" section demonstrated in FIG. 6A may be similarly or dissimilarly ordered. A dissimilar column ordering between these "life context" sections may advantageously prevent a user from being "trained" to associate each column with the same color and/or characteristics. These word groupings may be hard-coded into the displayed page, retrieved from the database 105 or other appropriate source and then displayed, or some combination thereof. FIG. 6C illustrates a "composite" screen containing each of the respective examples shown in FIGS. 6A and 6B. In the example shown in FIGS. 6A-6C, the word groups are grouped into life contexts, e.g., "at work", "home/family", etc. It should be noted, however, that the exemplary groupings demonstrated in FIGS. 6A-6C are provided by way of example and not limitation. Groupings and/or life contexts may be added, removed, combined, or utilized without departing from the scope of the invention. Once the user is satisfied with their "word sort" selections, the selections are saved to the database 105. In some embodiments, the user's personal color profile is then determined based on a computerized "whole person" contextual assessment ("WPCA") of the user's color sort and word sort.

According to aspects of the invention, the user's WPCA is programmatically determined based on the user's stored selection data. Optionally, the PAS may programmatically determine the WPCA based on the user's selection data as stored in memory, such as but not limited to, a physical memory and/or a virtual memory. In some embodiment, the WPCA is determined by way of a weighted assessment scoring methodology. For example, as the user completes each step of the assessment, values are stored in the database 105 to apply a weighting value to a color value. By way of example and not limitation, in the "At-Work" category (FIG. 6A), if the user identified "Blue" attributes as being their most predominant, those attributes are assigned a value=4, which is stored in the database 105. For example, the column labeled "Cooperative, Expressive, Supportive" in FIG. 6A are characteristics associated with the color "Blue". The second most predominant set of attributes is assigned a value of 3, then 2, and then 1, e.g., for a selected color order of Blue attributes, Green attributes, Gold attributes, and Orange attributes, the stored values are atwork_blue: 4, atwork_green: 3, atwork_gold: 2, atwork_orange: 1. In this example, once the logged-in user completes all of the categories, e.g., "At Work", "Home/Family". "With Friends", "My World View", "My Self-View" in FIGS. 6A and 6B, the weighted values for each color are aggregated across all of the categories, e.g., atwork_blue+homefamily_blue+withfriends_blue+withfriends_blue+myworldview-_blue+myselfview_blue . . . , to compute an aggregated value for each color. The values from the initial "color sort" (e.g., FIG. 5B) are added to the aggregated value to determine a total weighted value for each color. In this example, the maximum possible total weighted value for each color is 24 and the minimum possible total weighted value for any color is 6. If any of these totals result in a tie, the higher ranked color from the "color sort", e.g., in the first step of the assessment as demonstrated in FIGS. 5A and 5B, determines the tie breaker. FIG. 7 illustrates an exemplary set of computer-executable instructions for determining the weighted assessment scoring method described above. Other assessment scoring methods may be used to calculate the WPCA without departing from the scope of the present invention.

Figure 8A:
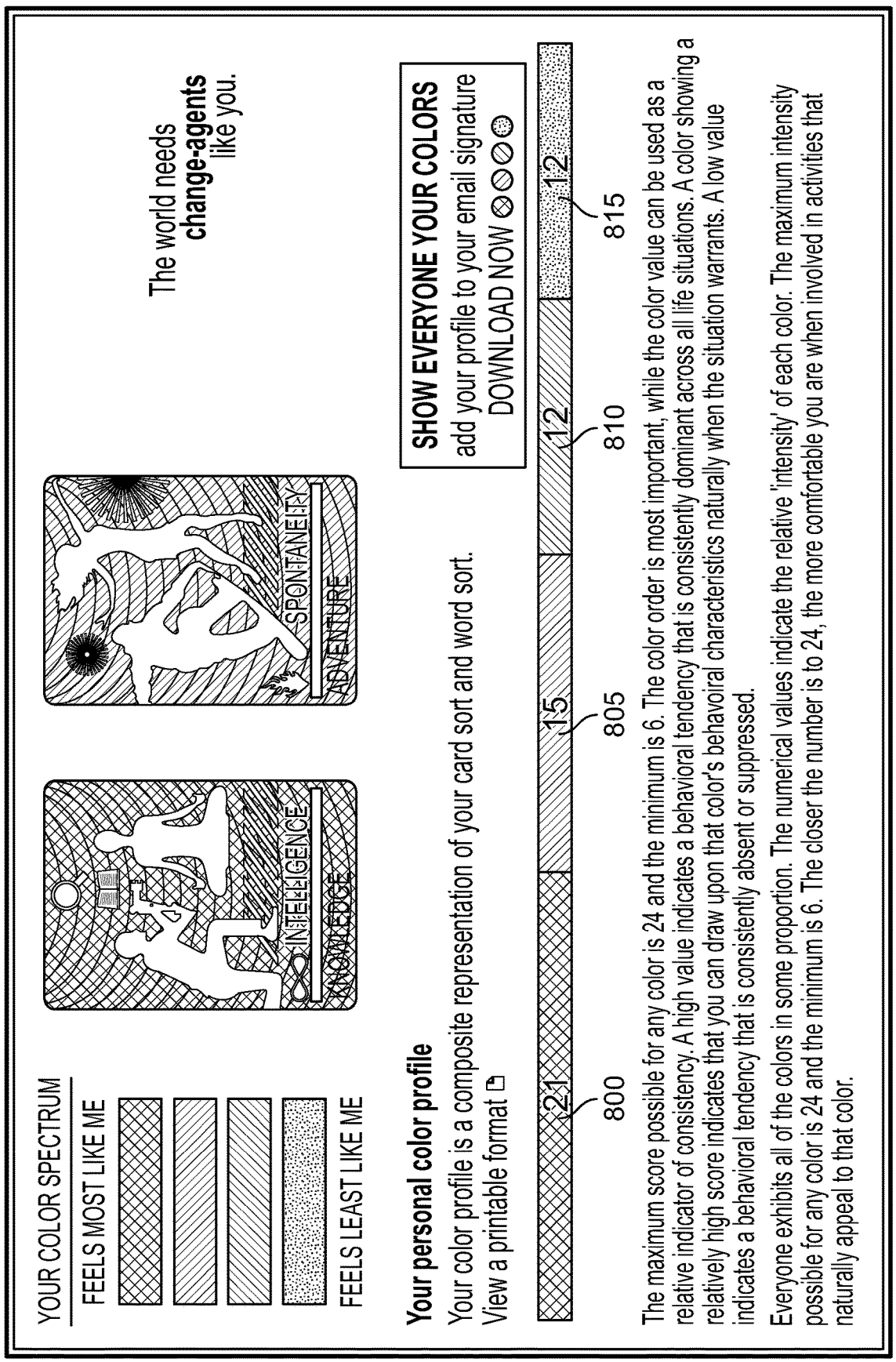
Figure 8H:
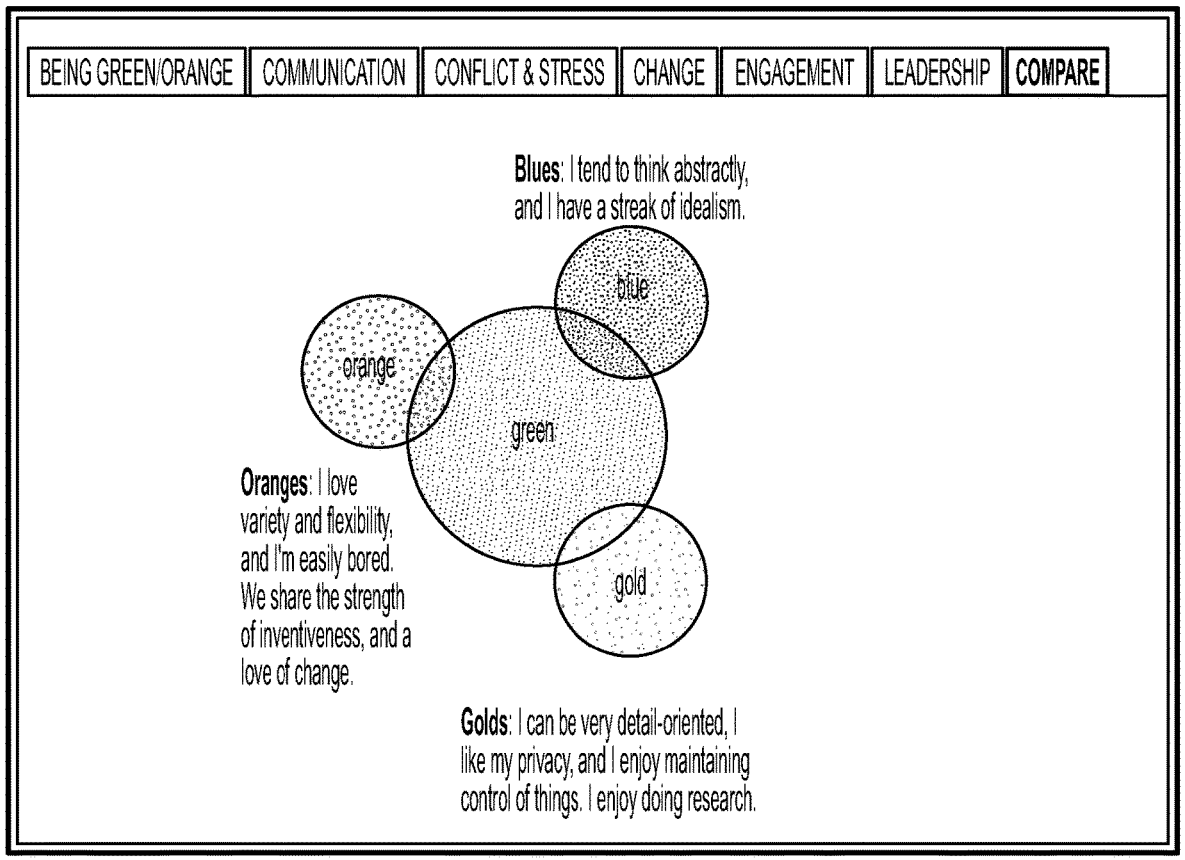

An exemplary WPCA is illustrated in FIG. 8A as a "personal color profile". In this example, "Green" is the predominant color with a total weighted value of 21, as shown at element 21. "Orange" is next with a total weighted value of 15, shown at element 805, followed by "Blue" with a total weighted value of 12, shown at element 810. In this example, "Gold" comes in last with a total weighted value of 12, shown at element 815. Information regarding the significance of the order of the colors, the weighting of the colors, and/or any other pertinent data is presented at the user to review. The generated personal color profile may be considered indicative of the user's temperament. FIGS. 8B-8H demonstrate examples of this information, arranged as a series of tabs on a webpage for the user to navigate between. Information regarding the significance of the various color orders, the weightings for the colors, their contextual relevance, and/or any other pertinent data relevant to an assessment may be stored in the database 105 and accessed therefrom, retrieved or accessed via the Internet or other computer network, stored and/or accessed from other storage mediums, some other(s), or some combination thereof.

According to aspects of the invention, once the user has completed an assessment, information relating to the assessment may be displayed via the "my dashboard" display, as shown at element 900 in FIG. 9 and/or may be selectively displayed or presented as appropriate. For example, in FIG. 9, the logged-in user's color profile is additionally shown at 905 under the "Users" tab 910. In this example, the account administrator has enabled viewing of other account users' assessments, as shown by the color profile at element 915. The ability for the user to see their assessment results, along with other users' results like in FIG. 9, permits the user to, among other things, gain insight into the personalities of the other users associated with the account within a particular group. For example, the logged-in user can click on the color bar 915 for another user and read or otherwise inspect information related to the color order of the bar 915. This information may be presented in the manner most appropriate for the user, such as but not limited to, a pop-up or pop-over screen, a downloadable document (e.g., pdf) or as a new user interface screen, as appropriate for the user's device. An exemplary mobile-enabled PAS is described below.

For example, the user may create one or more groupings including a subset of users within the account ("groups") if the administrator or other user with appropriate permissions (collectively "administrator") for the account has enabled such functionality. If such functionality has been enabled, the user may elect to create a group via an appropriate selection mechanism, such as the "Create New Group" button at element 310 in FIG. 3B. Upon selecting this option, the PAS provides the user with the ability to perform appropriate "group" functions, such as but not limited to, editing, managing, updating, and/or deleting the group. These functions may also include the ability to add users to and/or remove members from the created group, based on the appropriate user permissions as determined by the account administrator(s), facilitator(s), or other appropriate user(s). FIGS. 10A and 10B demonstrate exemplary user interfaces for performing functions related to the created group. For example, after creating a new group, the user may add and/or remove individual other users to the group. FIG. 10B illustrates an exemplary interface for performing group-related tasks.

Figure 11B:

Other functionality may be available to the user, as determined by the account administrator. By way of example and not limitation, members can create groups, as noted above, and view Group Analytics. FIG. 11A illustrates one such example—the pie chart at 1100 depicts the breakdown of all group members by first color, which relates to the predominant temperament exhibited within the group. The Pareto diagram at 1105 shows the aggregation of all four colors across the group population. An administrator may dictate whether the group analytics displays the personal color bar 1100 for each user (alternately referred to as an "Aggregated Assessment Result"), the "At Work" results 1110, or both. Optionally, the user may be permitted to access and/or download group results in an appropriate file format, such as but not limited to, an XML file, a CSV file, a tab-delimited file, or other standard or proprietary format.

It should be understood that while various user functionality is described above, these examples are merely illustrative of various aspects of the present invention and is not intended as an exhaustive or exclusive list of features and functionality of the invention. Other features and functionality, while not expressively described, may be provided and/or utilized to effect and/or execute the various displays, functionality, data storage, etc., utilized to provide computerized assessments and their associated contexts.

Figure 12A:

As noted above, administrators of an account have the capability to activate and deactivate various features and functionality of the PAS. For example, FIG. 11A displays one example of an interface displayed to an administrator, with access to exemplary administrative functionality shown at 1115. The accessible functionality includes, but are is limited to, "My Facilitators" as demonstrated in FIG. 12A, "Manage Account Users" as demonstrated in FIG. 12B-12D, and "Manager" functions as demonstrated in FIG. 16 and further described below. The "My Facilitators" view in FIG. 12A allows, among other things, allows account administrators to view a list of all of the users in the account who have either administrator status or facilitator status. Administrators may access the user dashboards of other administrators and facilitators from this screen simply by clicking on the name of the desired administrator/facilitator. From any facilitator's dashboard, the administrator can remove facilitator status for that user. The "Manage Account Users" functionality allows, among other things, administrators to manage users who have been previously invited to register. The administrator may resend invitations or un-invite individuals who have not yet completed their assessment. The administrator may also remove users from the account, demonstrated in FIG. 12C, so that the user is no longer associated with the account.

Figure 13A:
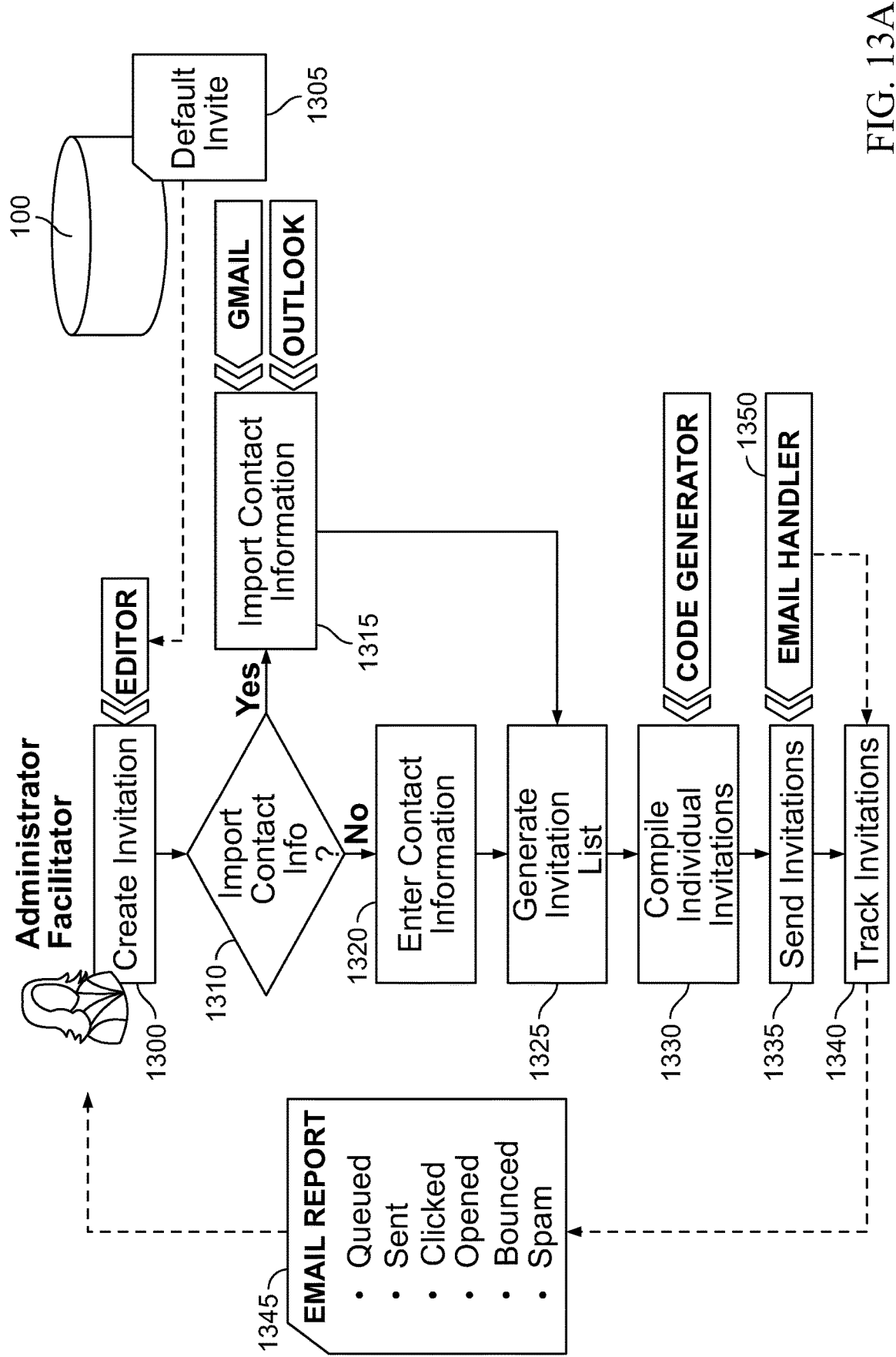

Aspects of the present invention advantageously allows for creating email invitations, sending the invitations to email recipients, and thereafter tracking the engagement of the recipient with the email. In some embodiments, the PAS includes an integrated email-based invitation method and/or system that makes it convenient for account administrators and designated facilitators to invite individuals to become members of their account and complete an assessment. For the purpose of describing the invitation system, the account administrator(s) and designated facilitator(s) are collectively referred to as "senders". FIG. 13A demonstrates, in flowchart form, one example of an invitation system according to aspects of the present invention. For example, administrators may purchase credits, which may then be used to send invitations. Administrators may invite individuals and/or authorize facilitators to invite individuals. In this example, each invitation consumes one credit. In other embodiments, each invitation may consume no credits, a fractional credit, multiples of credit, or some combination thereof, e.g., 0.2 credits, 1.7 credits, zero credits, etc. When the sender selects to create an invitation at 1300, a default email is generated from a template 1305 with a predetermined "Subject Line" and body text, with appropriate variables for dynamically including information into the email, such as but not limited to, the name of the person sending the invitation, the account name, an invite code that is unique for every recipient, and the email address of the sender. In some embodiments, the sender may edit the generated default email.

Once the sender is satisfied with the format and content of the invitation email, the sender may elect at 1310 to import contact information from an appropriate data source at 1315, such as but not limited to, a file source, Gmail, or Outlook email systems or manually enter a list of names and email addresses for intended recipients at 1320, or some combination thereof. Based on this contact information, an invitation list is generated at 1325. The sender may optionally elect to add the recipient to an existing group or to create a new group (not shown), which may be named ad-hoc during the creation process. At 1330, invitation emails are created for each recipient based on the contact information and email template, with each recipient being assigned a unique code/link. At 135, the emails are sent to the recipients or, alternately, placed into an email queue and sent at a later time. Each email further includes one or more elements for determining the email was open, e.g., a 1-pixel image URL that uniquely identifies the opening of a particular email when the image is requested for display. However, any other suitable method or means for detecting the opening of the email may be used. When the recipient clicks the unique link, the unique code is used in the recipient's user registration process, an example of which being described above. FIG. 13B demonstrates additional exemplary interfaces for sending invitations according to various aspects of the present invention.

In some embodiments, the invitation system further provides tracking/analytics functionality to the sender, an example of which is illustrated in FIG. 12D. By way of demonstration and not limitation, information regarding invitations may be presented, displayed, or otherwise provided to the sender via the "My Dashboard" screen or via any suitable electronic communication, such as email report 1345 in FIG. 13A or text message (not shown). The information may include, but is not limited to, the sender's contact information, the intended recipient's contact information, when each email was placed in the queue to be sent, when each email was sent, when the email was opened by the recipient, when the embedded link/code was clicked, if the email bounced and redelivery will be attempted, if the email bounced and will not be redelivered, and if the email was rejected by recipient's email provider as spam. Optionally, tracking information may be integrated or utilized by account administration and billing functions. For example, if the sender's account currently has 100 available invitations, but the sender attempts to send 150 invitations, the PAS may automatically bill/charge the account for 50 additional licenses at the appropriate pricing level, as described above. Alternately, the PAS may prompt the sender to confirm the additional purchase or may notify the sender that sending a particular quantity of emails exceeds the number of available invitations.

It should be understood, however, that FIG. 13 merely illustrates various steps utilized by the exemplary invitation system described above. Other invitation methods and systems within the scope of the present invention may omit, combine, alter, or add other elements, steps, and/or features, or some combination thereof. In some embodiments, email invitation functionality may be freely accessible to account administrators or may be provided upon payment of a fee, as determined by the PAS operator.

Additional administrative functionality may be available and provided to account administrators as appropriate. By way of demonstration and not limitation, privacy settings may set at three levels: Account, Group, and User. An administrator may elect to set the "Account"-level privacy default to either allow or disallow users within the account to see other users' profiles. If the "Account"-level default is set to allow viewing by users, each user will be able to view all other users' profiles. If an Administrator sets the "User"-level privacy default to allow individual users to hide or show their own profile, certain users' information may not be visible to other users based on individual user settings. If the "Account"-level default is set to disallow viewing by users, only administrators and facilitators will be able to access user profiles and create groups. The administrator(s) may set one or more alerts, which may, among other things, notify designated individuals when certain events occur. By way of demonstration and not limitation, "Balance Alerts" may be set to notify designated individuals when a facilitator's available assessment credits fall below a predetermined or specified amount and/or when the number of assessment credits available to the account falls below a specified amount.

As noted above, the "Groups" function allows users to create and view information related to a subset of the users within an account, as demonstrated in FIG. 3A-3B. For example, a user may use the Group (and/or "Create a Group") functionality to show a particular department, team, participants of a meeting, participants in a training event, etc. The Group functionality computes and graphically displays statistical representations of the members of the Group, and displays a list of the Group members showing each user's profile. Depending on the "Account"-level privacy settings described above, all users may or may not be able to view other users' information and therefore, may or may not be able to create and view Groups. With respect to Groups, there are three Group Privacy levels: Private, Group, and Account. If the Group Privacy is set to "Private", only the user who created the group and administrators can see the group information.

If the Group Privacy is set to "Account", and the Account Privacy setting allows all users to see all other users' information, all users within the account may access the group information. If the Group Privacy is set to "Account" and the Account Privacy setting prevents all users from seeing all other users' information, only administrators and facilitators can see the group information. If the Group Privacy is set to "Group", the group information is accessible to administrators, facilitators and all users in the group, whether or not the Account Privacy is set to allow or disallow viewing of users' information by other users. In other words, this arrangement of privacy settings advantageously allows administrators and/or facilitators to create groups and share the group information selectively. For example, a department head may elect to share information within that department, or a training facilitator may elect to share information with class/seminar participants, etc.

According to aspects of the present invention, users may access information from the PAS via a published application programming interface ("API"). The information may include, but is not limited to, user profile information, assessment information, and account information, depending on their user type, e.g., "standard" user, administrator, facilitator, etc. Once accessed, the user may include the information in their own applications, such as HRIS, recruiting, onboarding, performance management, call center, CRM, and other applications as desired by the user. The API additionally allows users to access the information via one or more mobile applications, as example of which is described below.

Figure 14:
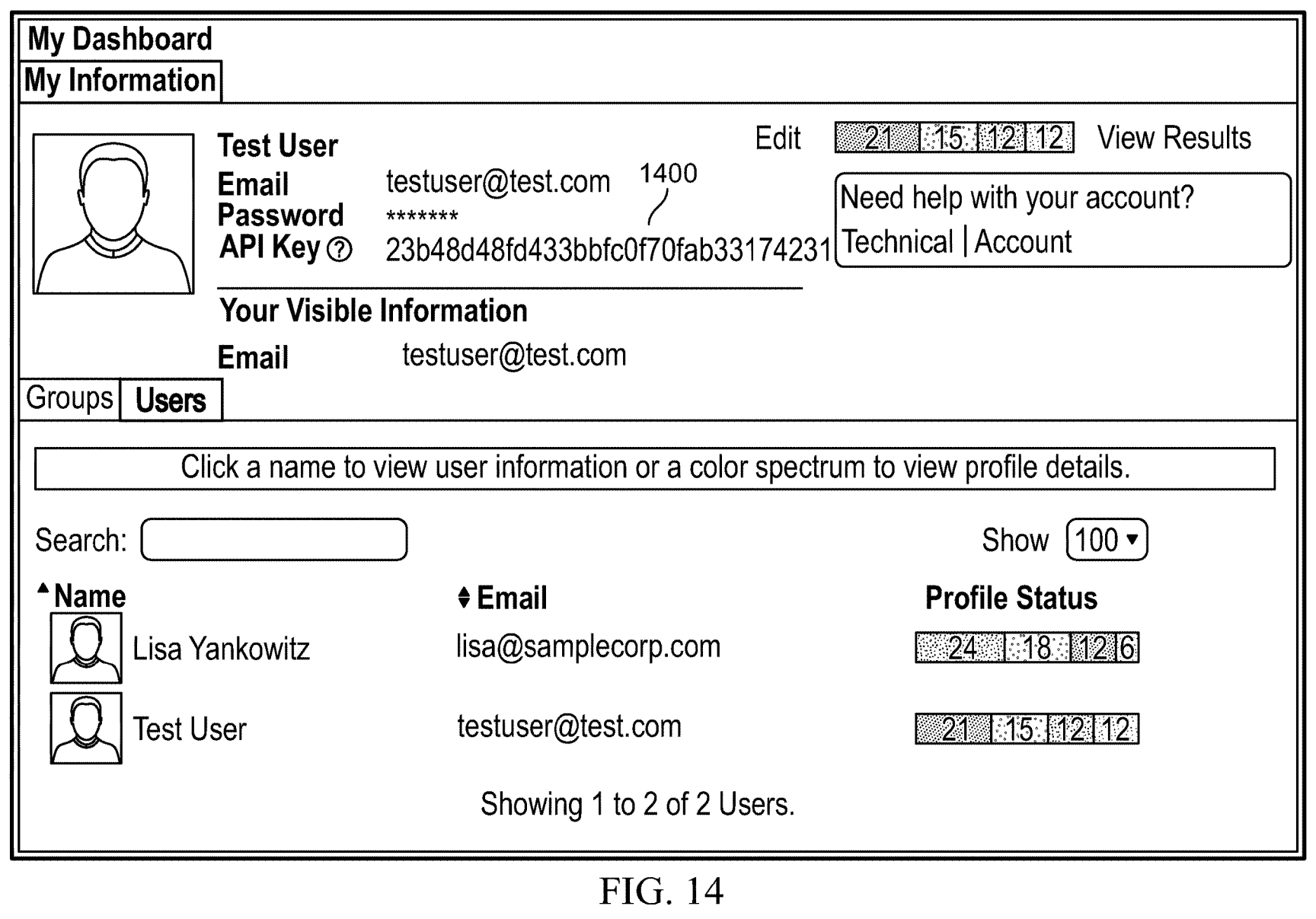

In some embodiments, the user is assigned a unique API key. For example, FIG. 14 shows the "My Dashboard" display for the user shown in FIG. 9, with an exemplary API key illustrated at 1400. The user's API Key is associated with the access privileges associated with that user based on their role within the account, e.g., Super Administrator, Account Administrator, Reseller, Facilitator, or User. The published API provides the user with a set of programmatic calls to perform supported functions. By way of demonstration and not limitation, the API may allow the user to: get a list of accounts that a user with a specific API Key is a member of, i.e., users can be a member of multiple accounts, get specific account information such as the role associated with a specific API Key and registered contact information for the account, get a list of all users in an account, get the temperament information stored for a specific member within an account, get a list of groups within an account, get a list of groups a specific user is a member of, and get a list of users in a specific group within an account. This list, however, is not intended to be exhaustive, as the API may provide access to any or all data accessible to the PAS and/or functionality, based on the user's access level.

Figures 15A, 15B, 15C:
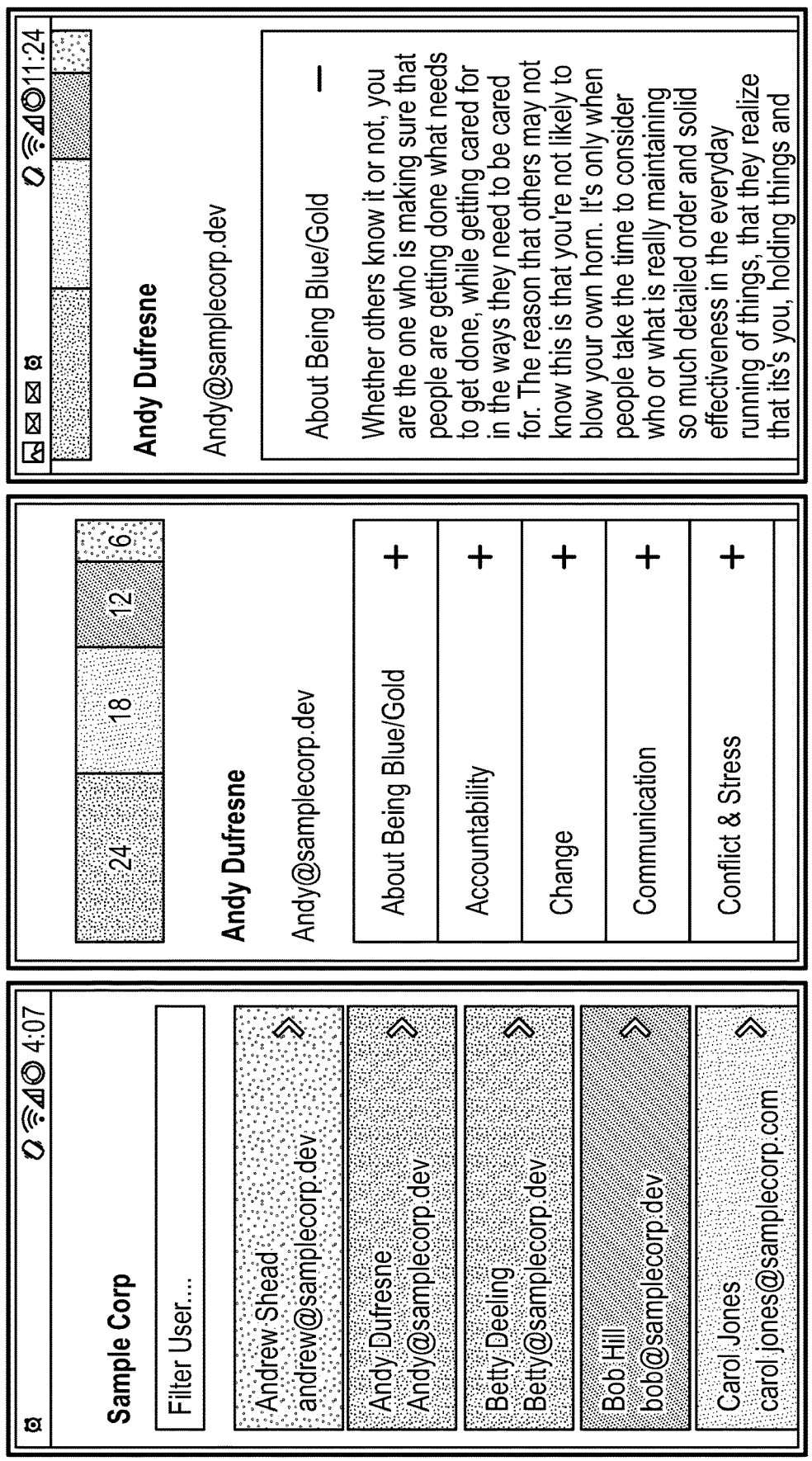
FIGS. 15A-15C illustrate exemplary user interfaces of a mobile application accessing an exemplary personal assessment service according to various aspects described herein.

According to aspects of the present invention, one or more mobile applications may allow users to access information from PAS, as described above, in accordance with the privileges assigned to them by an account administrator of the account they are accessing. One such exemplary application is the "Ntrinsx Advisor" application available in the Google App Store and the Apple App Store. FIGS. 15A-C illustrated exemplary screenshots for the "Ntrinsx Advisor" mobile application. A user may, however, use any suitable mobile application that utilizes the API and their unique API key, as described above, to access PAS information. For example, the user may download an application from the appropriate App Store for their respective mobile device. Once the user has a suitable mobile application installed on their respective mobile device, the user provides, inserts, or otherwise supplies the API key to the mobile application. On the basis of the supplied API key, the mobile application permits a user to, among other things, access any account they are a member of (users may be a member of multiple accounts) by clicking on the account name, browse the first color of all users in the account, list all account Members (see FIG. 15A) alphabetically, and search for a specific member by entering their name or email address in the search box. The user may additionally view the Aggregated Assessment Result and/or "At Work" Result for any user by clicking on their name (see FIG. 15B-C) and view tips on how to show respect for the values for any person by clicking on specific topics associated with the selected member. The displayed tips may include, but are not limited to, what to consider when holding a person accountable for their actions, communication advice, how to avoid conflict and reduce stress, how to deal with change, how to best engage the person, and tips on providing better leadership and dealing with the person as a leader. These tips may be hard-coded into the user interface(s), stored and accessed from a local memory, retrieved from an appropriate data source such a file, a database or via the published API, or some combination thereof. According to aspects of the present invention, the tips are contextual with the primary color of the individual accessed by the user via the mobile app.

According to aspects of the present invention, the PAS 100 may additionally include one or more "super" administrator functions that permit, among other things, access to all resellers, accounts, users, registrants, offers, and orders within the PAS 100. According to aspects of the present invention, the operator of the PAS 100 generally retains super administrator status, but may delegate or otherwise provide super administrator status to other active user(s) within the PAS. For example, one such super administrative function allows one with super administrator status to designate or otherwise indicate a user as a reseller. A reseller is an individual who is authorized to resell the PAS 100. In some embodiments, the PAS 100 may prompt the operator to confirm the designation/indication. FIG. 16A-16D demonstrates exemplary components, functionality, and process flows associated with a reseller. In the exemplary diagram shown in FIG. 16B, a super administrator may, among other things, view, modify, and/or delete reseller settings (e.g., contact information, reseller's pricing model, optional private label, free invite credit limit, etc.). A super administrator may also establish a bank of invite credits to support a reseller's marketing efforts by allowing them to offer free assessments to their prospects. A super administrator may additionally access the reseller's accounts, thereby enabling the super administrator to, among other things, serve as proxy for account administrator(s) set up under the reseller. This advantageously permits a super administrator to serve as an "administrative assistant" to manage account settings on behalf of account administrator(s).

Figure 16A:
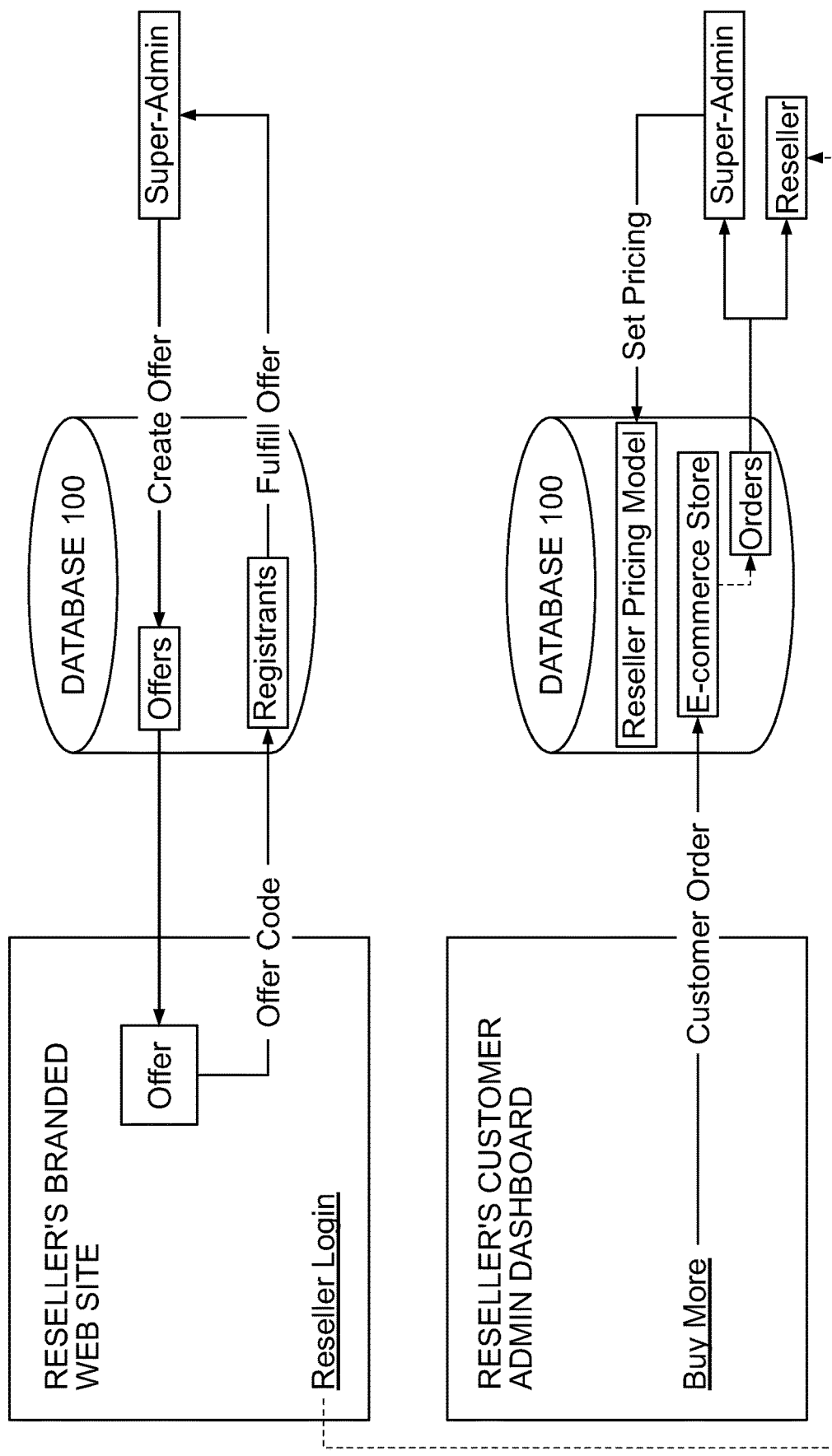
Figure 16B:
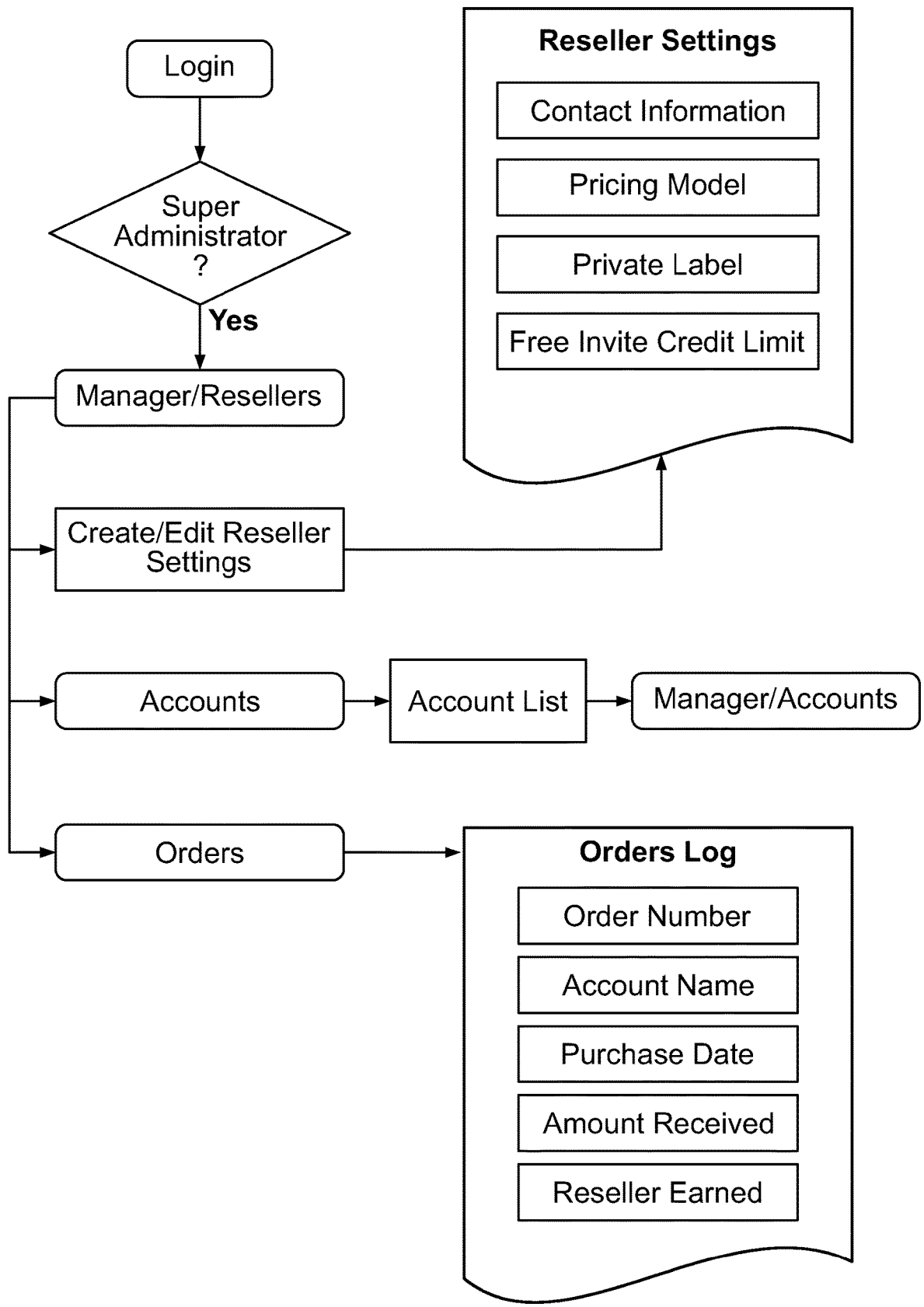
Figure 16C:
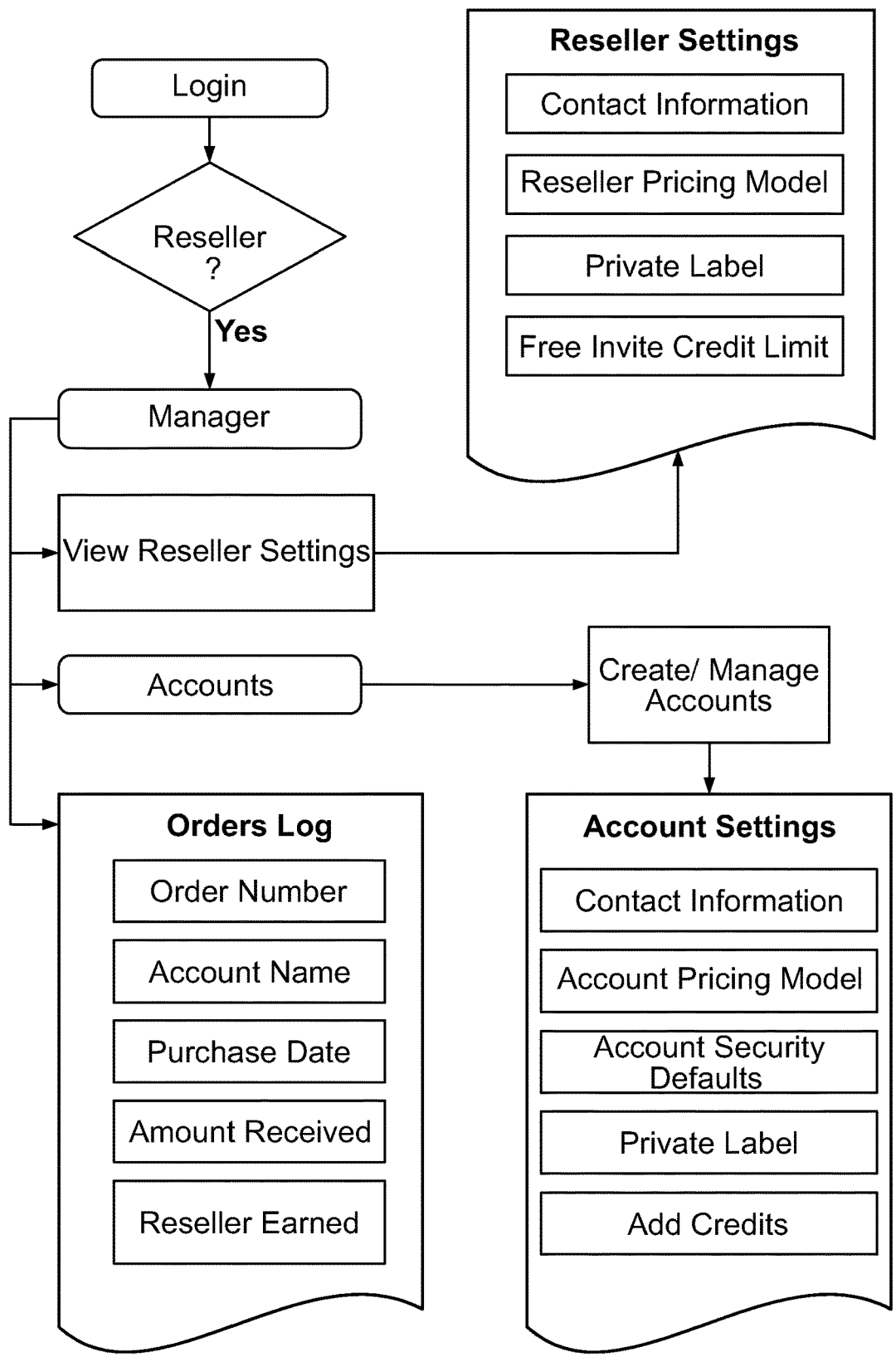
Figure 16D:
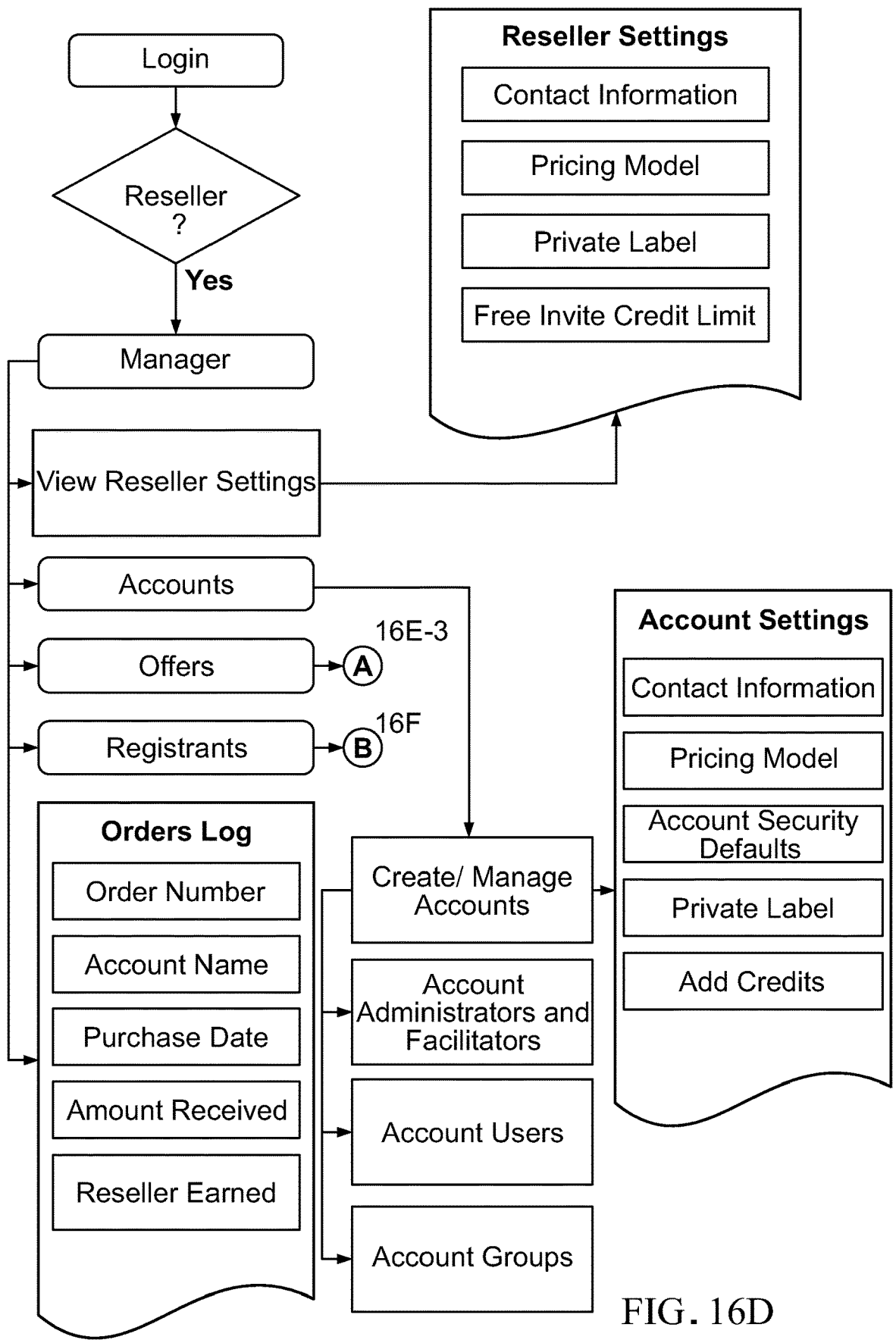

Super Administrators may also view a log of all orders placed by and/or through reseller accounts, providing documentation regarding order amounts and any amounts due to the respective reseller(s). According to aspects of the present invention, order amounts and/or amounts due may be determined as a function of, among other things, any custom pricing model(s) established for or by the reseller, such as a pricing model established by the reseller for purchases by reseller accounts, etc. For example, FIG. 16B-16C illustrate exemplary processes including the A reseller may set up accounts and optionally, private label the PAS 100 user interface screens, i.e., replace logos, colors, etc., throughout the PAS 100 to reflect the reseller's desired branding. FIGS. 16C-16D illustrate additional functionality that may be made available to a reseller, according to aspects of the present invention. For example, the Reseller may view their reseller settings that were established by a super administrator, e.g., contact information, reseller's pricing model, optional private label, free invite credit limit, etc. The reseller may view and/or edit account settings for accounts created by the reseller, for example but not limited to, account contact information, account privacy settings, and pricing model(s), enabling the reseller to act as proxy for account administrator(s) set up under the reseller. This advantageously allows the super administrator to serve as an "administrative assistant" to manage account settings on behalf of account administrator(s). Additional functionality, such as establishing/editing account pricing model(s), allows the reseller to modify, for example, prices and volume discount levels that may be selectively applied when the reseller's account purchases invite credits via the PAS 100. Resellers may additionally view a log of orders placed by the reseller's accounts, thereby providing documentation of order amounts and any amounts due to the respective reseller. According to aspects of the present invention, order amounts and/or amounts due may be determined as a function of, among other things, any custom pricing model(s) established for or by the reseller, such as a pricing model established by the reseller for purchases by reseller accounts, etc. The Reseller may also create offers and/or track registrants who engage with any of the reseller's private-labeled mini-assessment application, as further described below.

According to aspects of the present invention, an online e-commerce store and order tracking functionality may be embedded or otherwise enabled in reseller accounts. A reseller may establish their own pricing model, independent of the operator's pricing model, that automatically sets pricing in their instance of the online store, so that the reseller's customers see the reseller's pricing when ordering online. Online purchases placed through a reseller's store are tracked and all order tracking is accessible by the reseller online. According to aspects of the present invention, the PAS 100 may calculate any payments due to the reseller using any appropriate algorithm or calculation, such as but not limited to, subtracting the price charged to the reseller by the super administrator from the total customer purchase amounts.

Figure 16E:
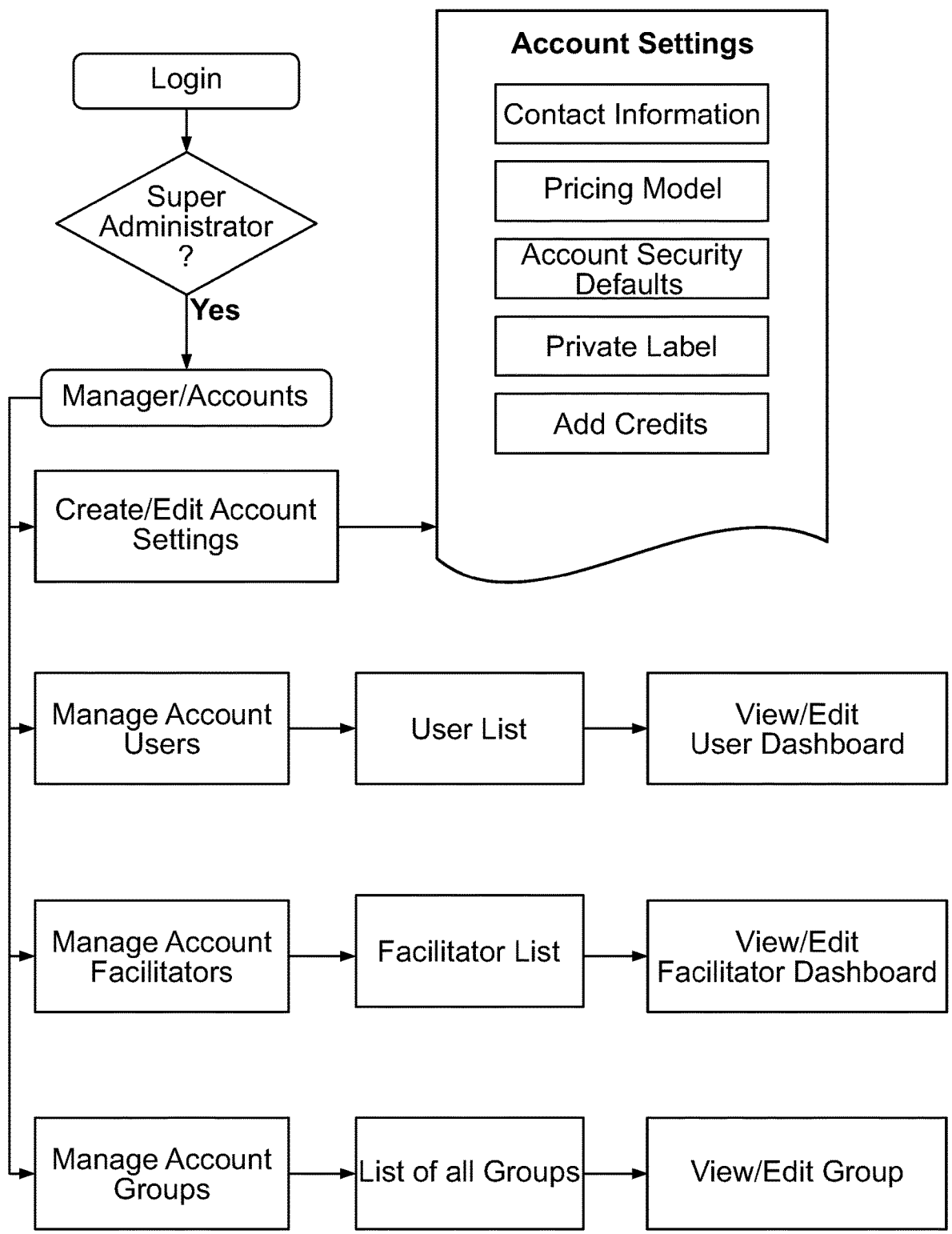
Figure 16F:
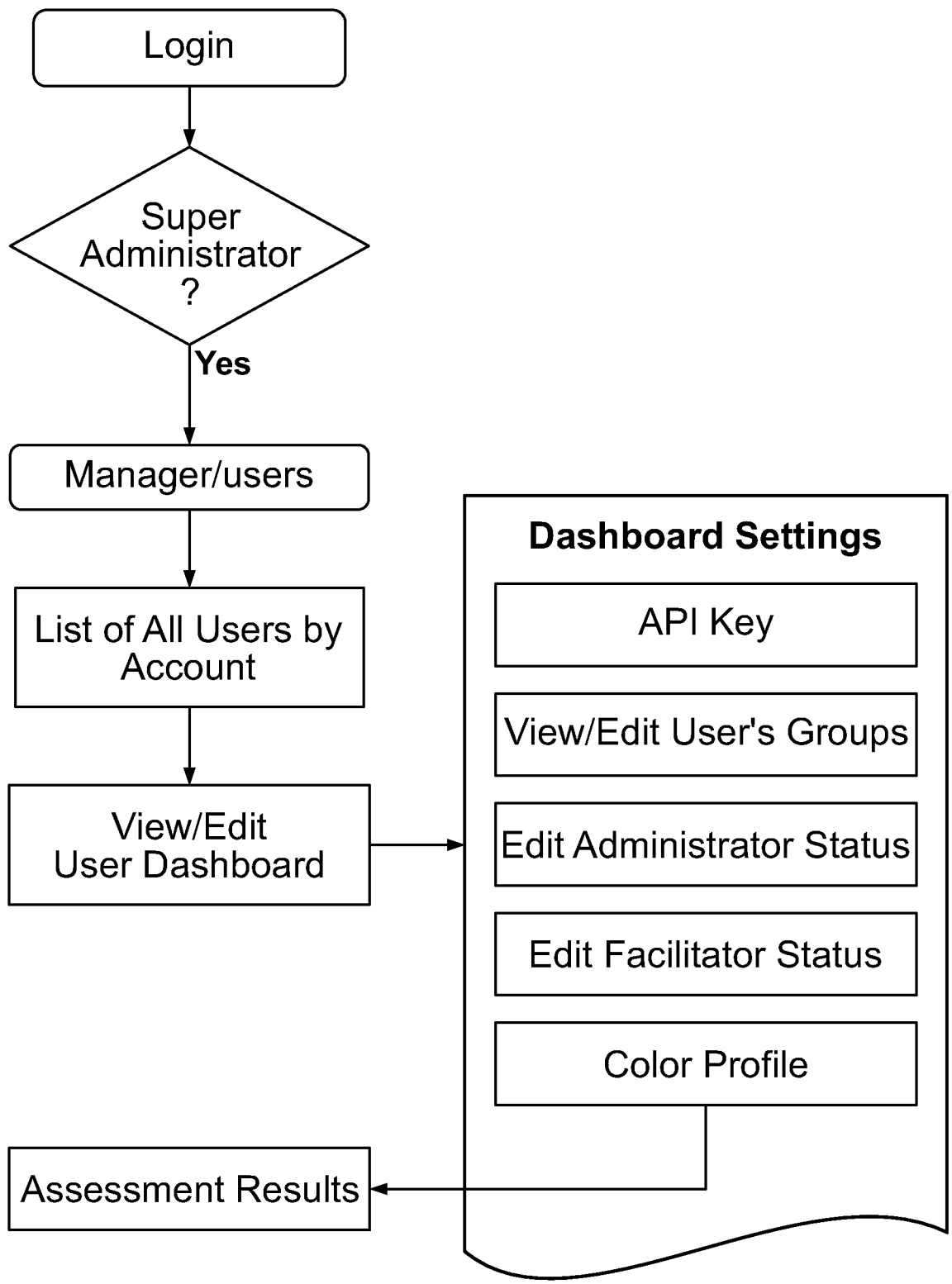
Figure 16G:
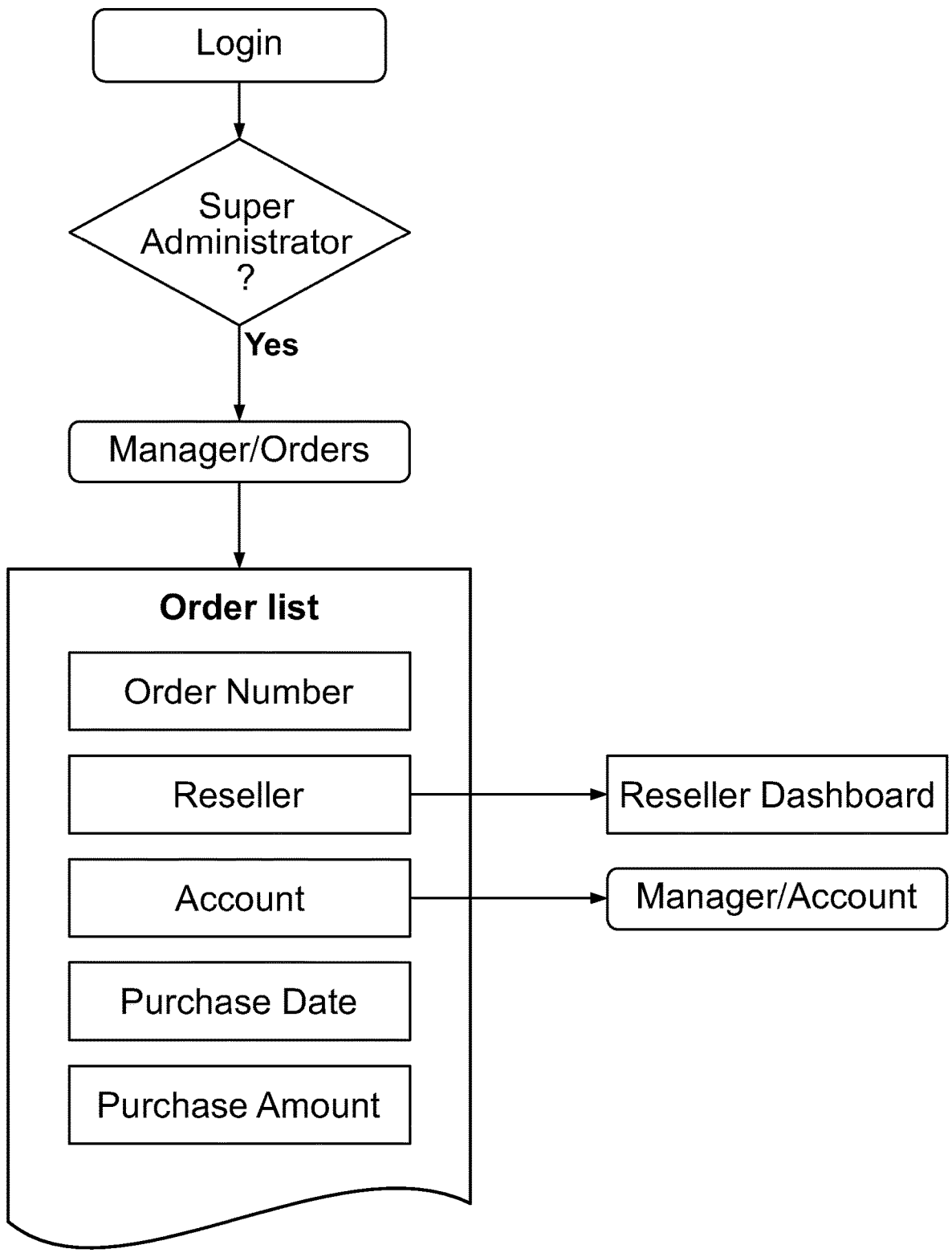
Figure 16H:
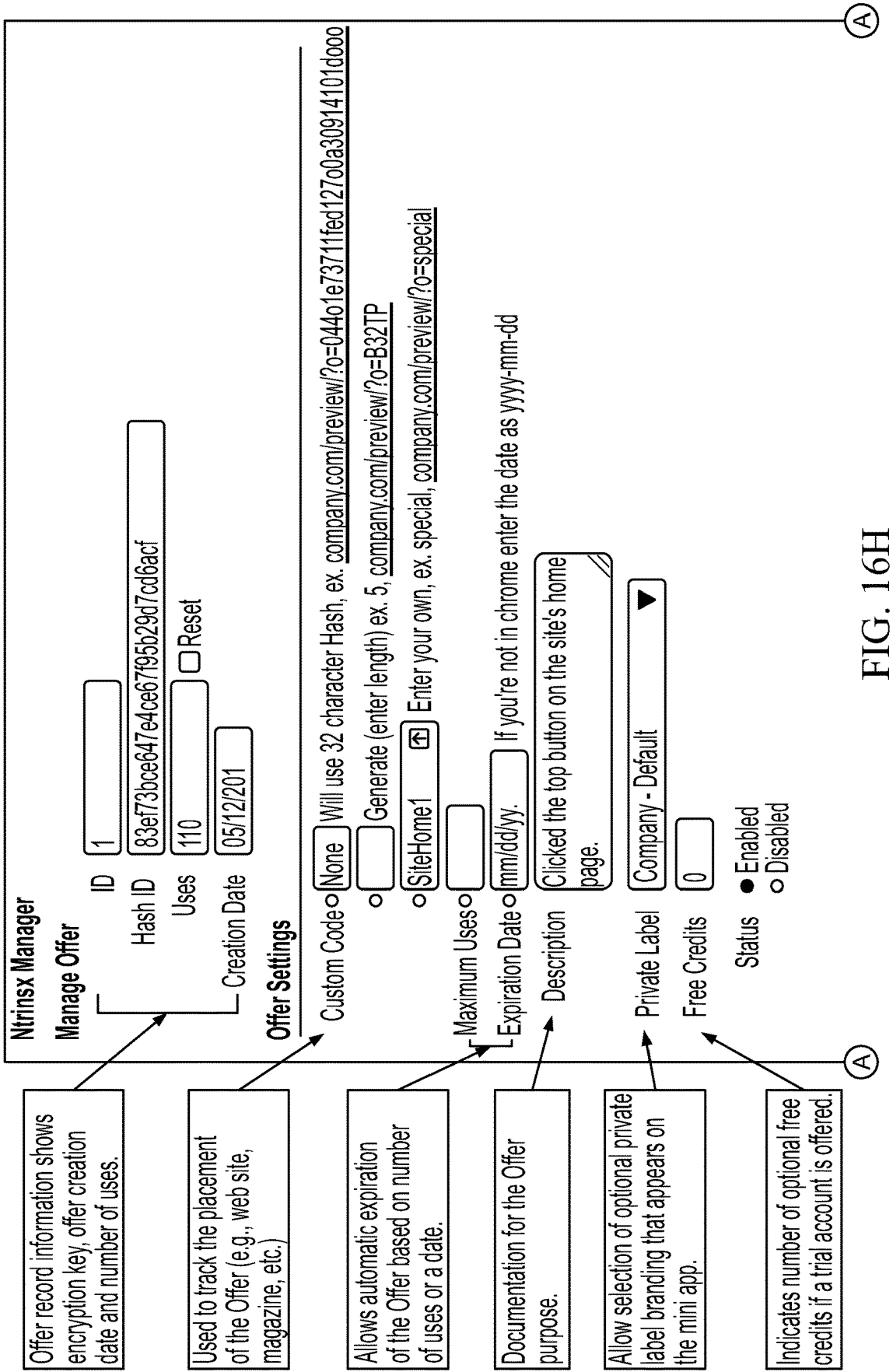
Figure 16H:
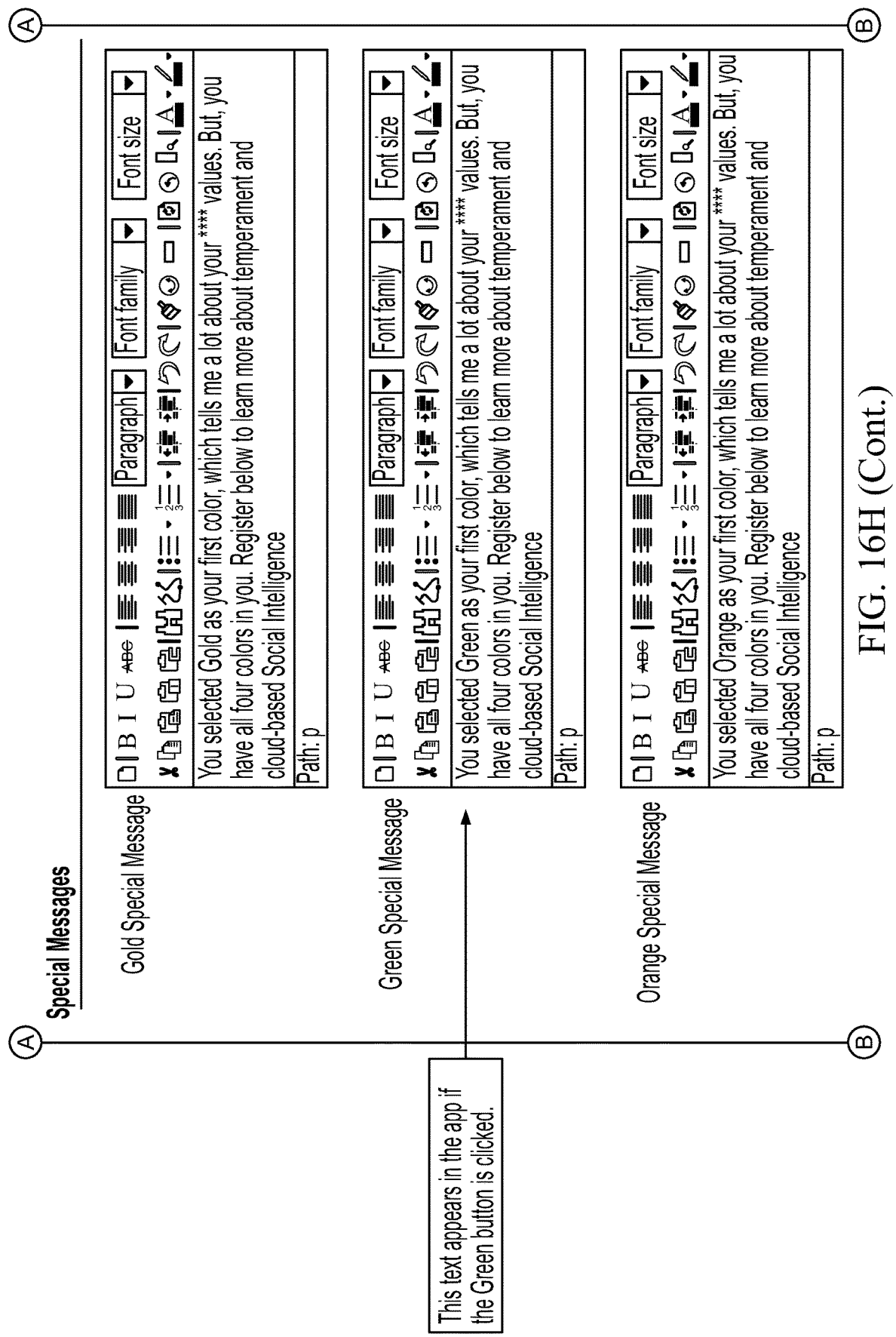
Figure 16I:
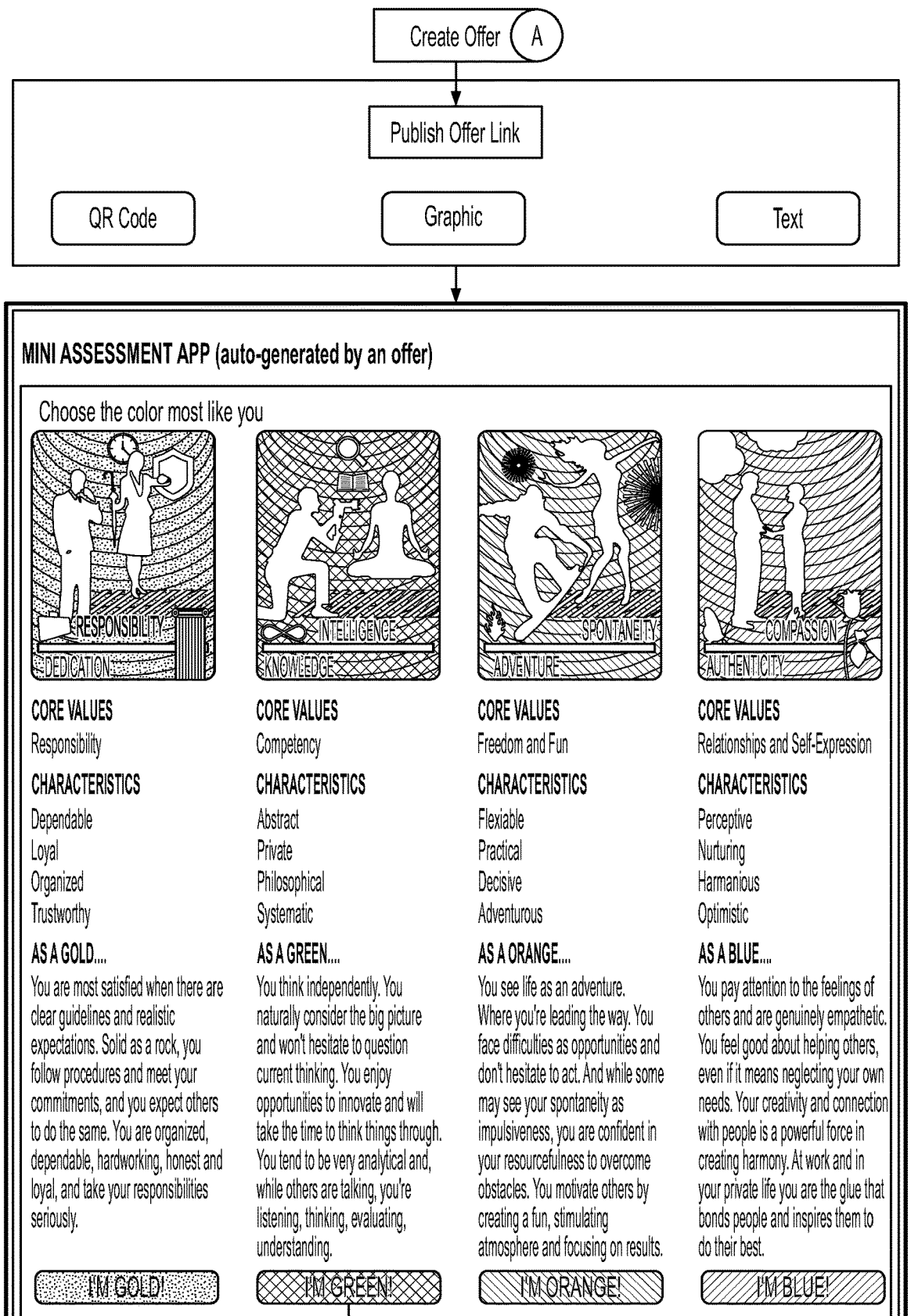
Figure 16I:
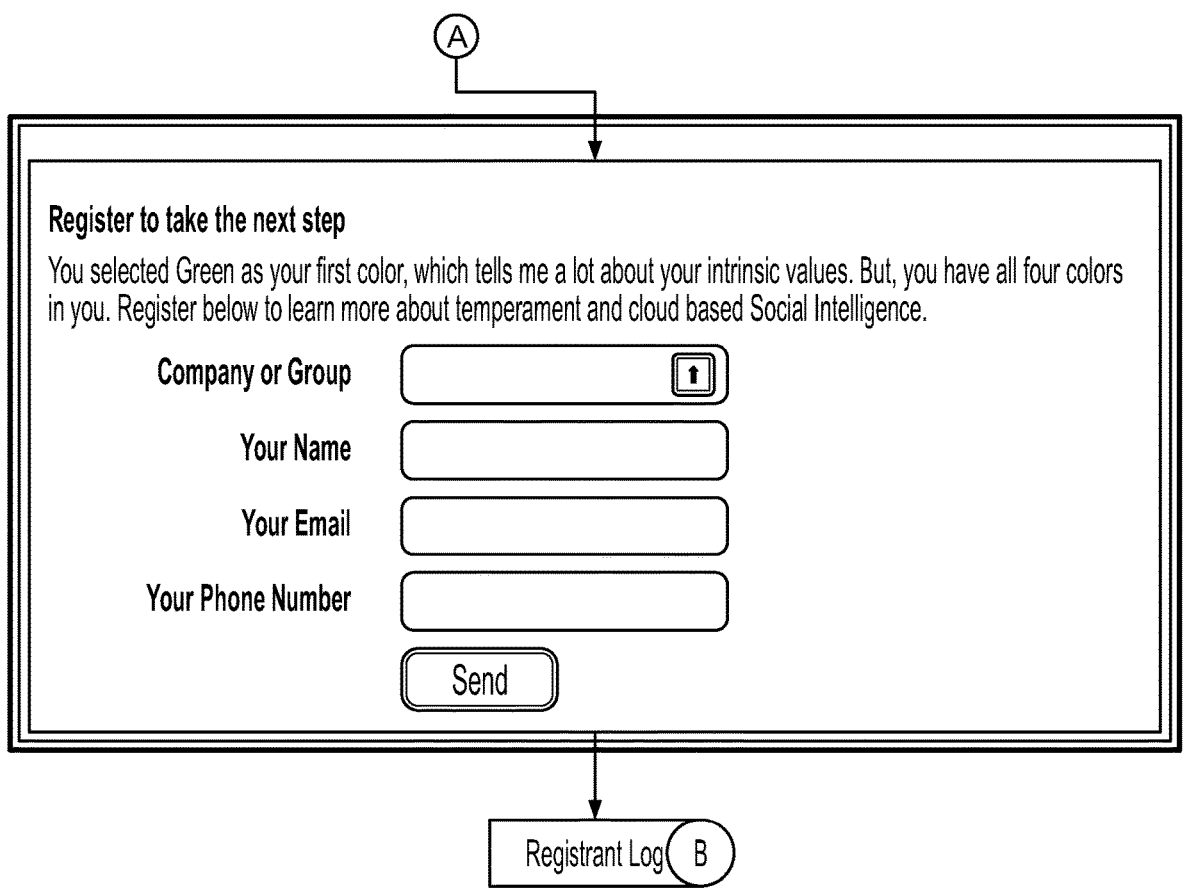
Figure 16J:
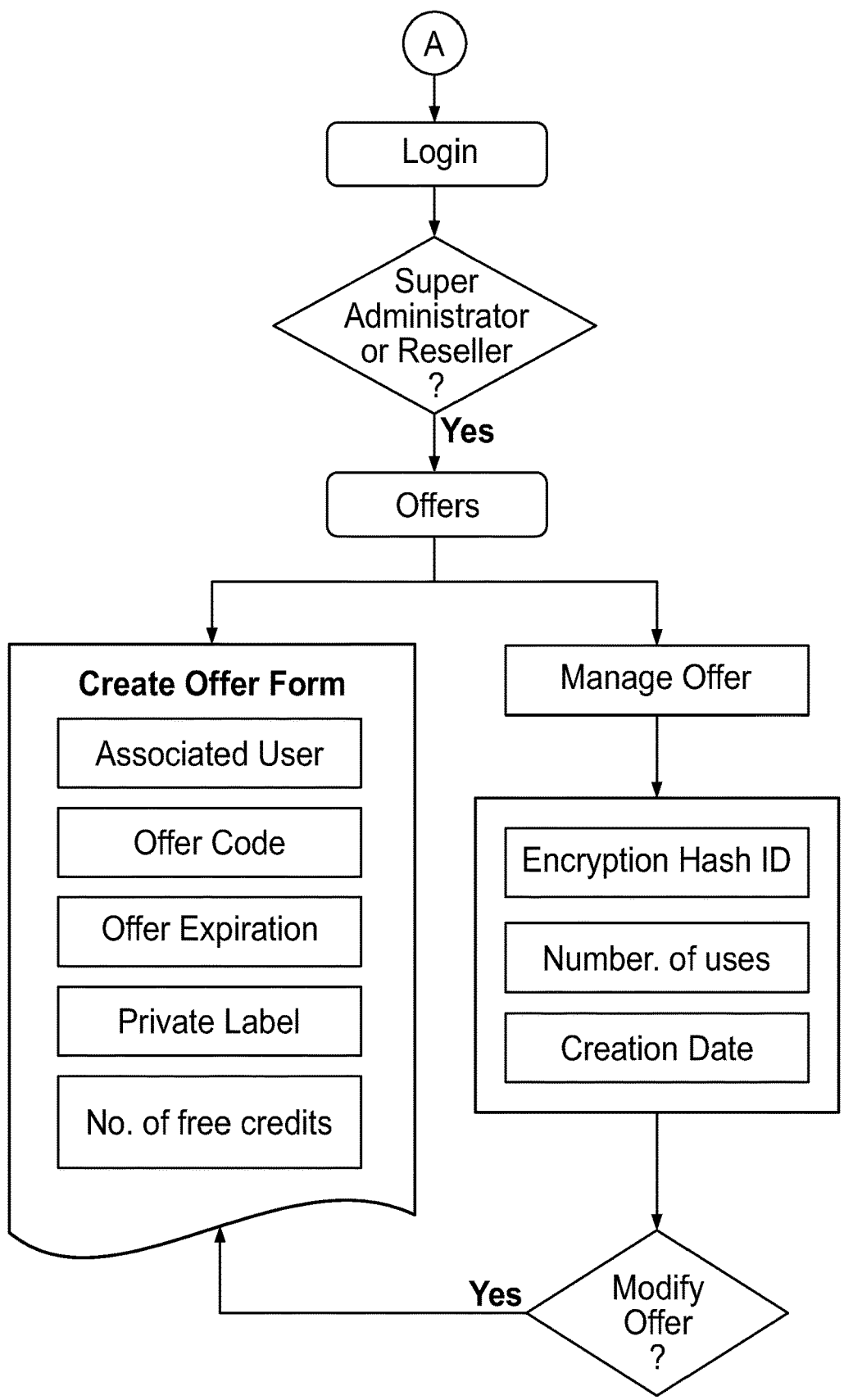

According to aspects of the present invention, the PAS 100 may additionally including functionality for allowing super administrators to create new accounts and manage existing accounts and/or users. By way of demonstration and not limitation, FIG. 16E illustrates an exemplary flowchart for creating and managing the accounts and/or users. For example, a super administrator may create a new account by registering contact information for the account, selectively setting initial account defaults, selectively creating an appropriate pricing model for the account, optionally associating any private label branding with the account, and selectively adding credits to the account's credit bank. For existing accounts, super administrators may, but is not limited to, enable or disable the account, change account registration information, modify the pricing model, modify account defaults, add credits to the account's credit bank, manage any user in any account (e.g., change facilitator status, remove admin status, remove from the account, and create or manage groups on behalf of the user), manage facilitators (e.g., change their facilitator status), manage groups (e.g., create or modify any group in any account), or perform some combination thereof.

According to aspects of the present invention, the PAS 100 may additionally provide functionality for allowing super administrators to, among other things, access the user dashboard for any user in any account within the super administrator's network of accounts. FIG. 16C illustrates an exemplary flowchart for such access. For example, the super administrator may access a particular user's dashboard and may, but is not limited to, modify the user's personal registration information including password, change facilitator status of the user, remove the user's admin status, or remove the user from the account, or some combination thereof.

According to aspects of the present invention, the PAS 100 may additionally provide functionality for allowing super administrators to, among other things, view a record of online orders for assessment credits that were transacted through one or more accounts within the super administrator's network of accounts. FIG. 16D illustrates an exemplary flowchart for viewing order records. For example, the super administrator may view the order number and information related to the order, including resellers' name (if the transaction was through a reseller), name of the account who purchased the credits, purchase date and time, number of credits purchased, amount paid by the purchaser, and any margin due to the reseller (if a reseller was involved in the transaction), or some combination thereof.

According to aspects of the present invention, the PAS 100 may additionally provide functionality for generating a mini-assessment application for, among other things, uses in promotions, e.g., in brochures or other printed marketing collaterals, online ads, or mobile app. For example, super administrators may create an offer that is associated with a unique instance of the mini assessment app. An exemplary user interface for creating and/or managing offers is demonstrated in FIG. 16E. When creating an offer, a super-administrator may specify the characteristics of the offer redemption, e.g., a specified number of free credits, free white paper, access to a seminar or webinar, etc. Interested parties may access the mini assessment app via an offer link, which can be published on a web site, mobile app, provided as a text link or QR code, or otherwise provided to and/or made available to interested parties, which may be used online to redeem the offer. Once an interested party accesses the mini assessment application, the application presents images and associated text to them for selection. By way of demonstration and not limitation, the application may display elements similar to those illustrated in FIG. 16F. Upon receiving the user selection, the application may then present a personalized offer registration form to the interested party. According to aspects of the invention, the text in the personalized registration form may be generated programmatically from the offer specification to present a message that is most appealing to a personality characterized by the chosen color. When the interested party completes the registration form, the associated registration information is transmitted to the PAS 100, which is then stored in the database 100 as a "registrant" and marked for redemption of the associated offer.

According to aspects of the present invention, the PAS 100 may additionally provide functionality that associates one or more offers with a user's registration, the completion of the user's assessment, or both. For example, if the offer is based on completion of a mini assessment, the specific terms of the offer are associated with a person (registrant) upon mini assessment completion. A super-administrator has access to the registration information, as demonstrated in the exemplary flowchart and user interface of FIG. 16H, which enables the super administrator to, among other things, follow up to fulfill the offer associated with the registration information. For example, the super administrator may refer the registration to a referrer if one is associated with the offer. A referrer is someone who has been authorized to publish an offer through their own marketing initiatives. If there is no associated referrer, a super-administrator may follow up to redeem the offer. In some embodiments, the super administrator may review the offer specification by selecting a displayed offer code indicated in the registration record and inspect the offer specification. For example, the super administrator may click on the green "Create" button that shows the offer specification and online form for registering the user within the PAS 100.

Figure 17A:
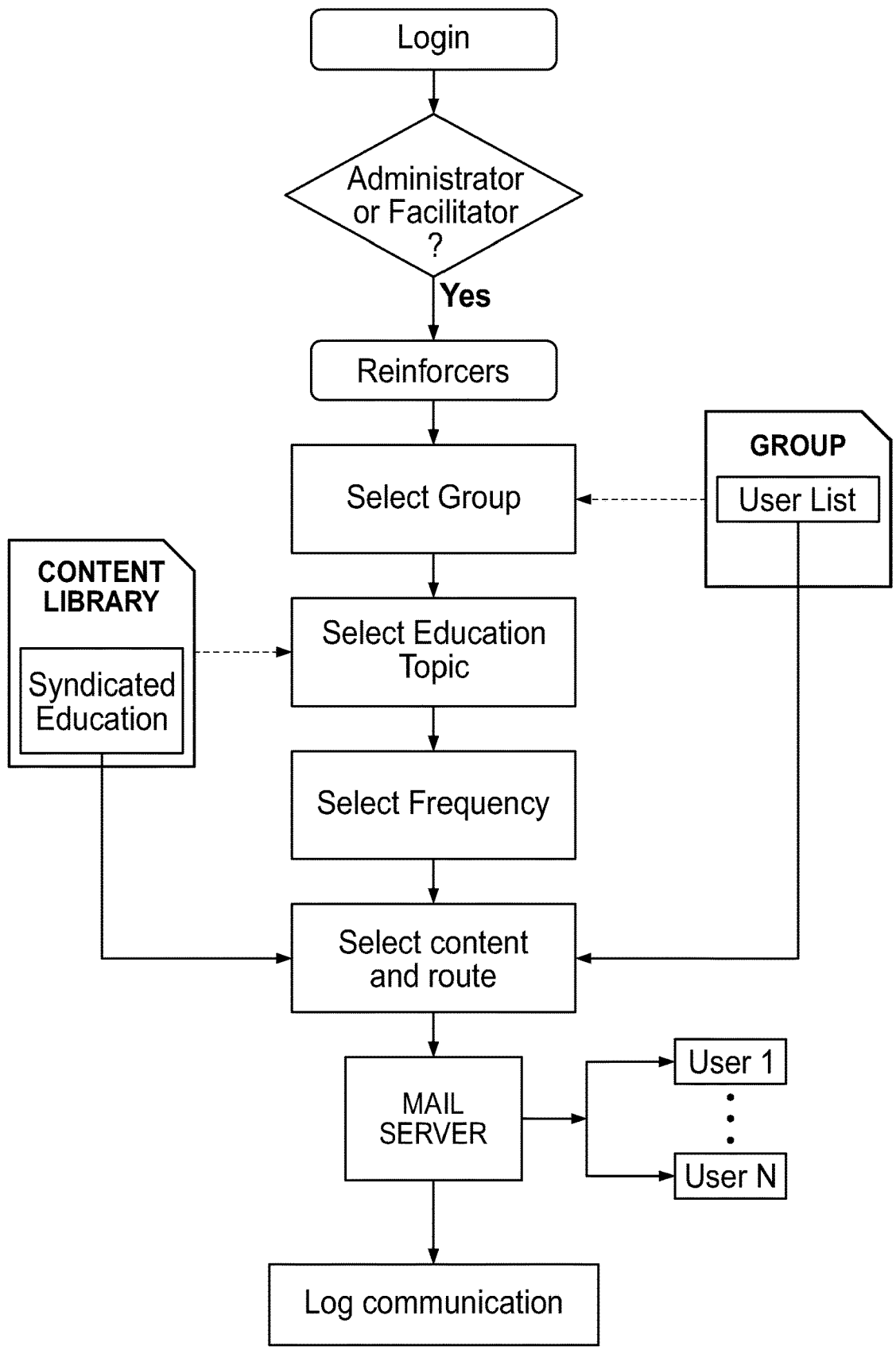
FIGS. 17A and 17B illustrate exemplary administrator and reseller processes, respectively, for processing and transmitting e-newsletters according to various aspects described herein.
Figure 17B:
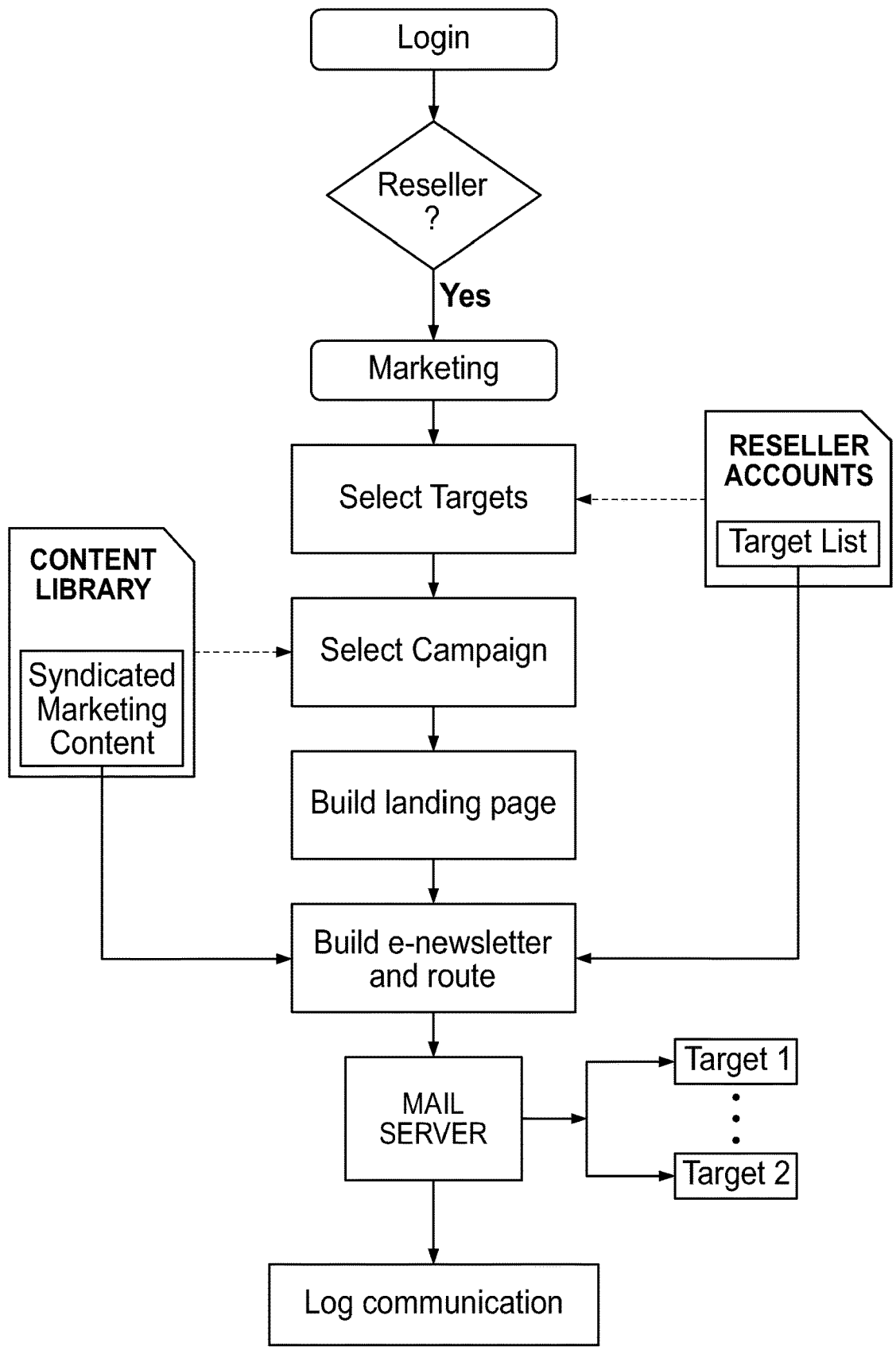

According to aspects of the present invention, the PAS 100 may additionally generate, provide, or other enable the transmission of e-newsletters for email delivery to users. For example, the operator of PAS 100 may selectively transmit one or more e-newsletters to the appropriate users for advertising and promotional purposes, such as but not limited to, providing discounts codes, volume discounts, newsworthy information, or any other desired information. FIG. 17A illustrates an exemplary flowchart of this process. In another example, a reseller may selectively transmit e-newsletters for similar reasons. FIG. 17B illustrates an exemplary flowchart of this reseller process. E-newsletters may optionally include training reinforcements targeted for all users, an appropriate subset of users, and/or particular users, or some combination thereof. For example, an e-newsletter may include leadership training resources, e.g., books, websites, videos, etc., that are designed to help those users whose assessments indicated that such resources would be appropriate.

According to aspects of the present invention, the PAS 100 may additionally include functionality for integrated communications. Integrated communications advantageously makes it easy for resellers and/or account administrators to deploy sophisticated communication media that relates to the recipient's temperament and/or personality. Typical applications may include, but are not limited to, announcements for meetings and/or training events, "how-to" instruction in connection with event/program registration, and training reinforcements. In some embodiments, an integrate communication "subsystem" operates based on templates, which may be modified programmatically to distribute communication media, such as but not limited to, different video segments based on subject matter criteria. Templates permit a non-technical person, e.g., marketing specialist, administrative assistant, etc., to set up campaigns from a library of available collaterals. For example, the communication subsystem may auto-generates campaign-specific landing page and HTML email, based on the template for a particular campaign. The communication subsystem may then set the campaign up for push deployment, pull deployment, or some combination thereof. A campaign may include, but is not limited to, text, video, downloads, contact list(s), form(s), a discussion forum, or some combination thereof.

By way of demonstration and not limitation, text may be used to position the campaign purpose, value proposition, etc. Campaign video may be defined by a "video builder", which allows a non-technical person to specify a video from the video content library, where the video may include multiple segments. Video segments may be automatically stitched together to allow programmatic production of a video that contains an intro video (e.g., a message from a prominent personality), body (e.g., a common element in multiple deployments, perhaps by a professional actor or actress) and exit message (e.g., a call to action by a prominent personality). The "downloads" may include, but are not limited to, documents, e-books, apps, etc. A campaign contact list(s) provides contact information for intended recipients, while the form(s) may request information for online registrations, etc. As noted above, a campaign may additionally include a discussion forum for community engagement. Campaigns may additionally be "private labeled" to promote a company, event, program, etc., by utilizing specific colors, images, and/or other attributes associated with the company, event, program, etc. For example, a campaign may be established to provide training "reinforcers". After a training event, multiple communications may be scheduled to reinforce key learnings. By way of demonstration and not limitation, the communications may include a small amount of text that acts as a quick reminder with a short statement of the learning concept, and a short 2-3 minute video that presents examples of the learning concept in action. The communications may then provide a means to access, e.g., a URL link, a discussion forum which encourages continued dialog weeks after the training event to embed the learning.

According to aspects of the present invention, the communication subsystem of the PAS 100 may additionally include functionality for enabling outbound marketing. For example, outbound marketing campaigns may be scheduled to create awareness and educate customers and prospects on the sender's value proposition. Senders may include the operator(s), super administrators, resellers, etc., or in the case of internal marketing, account administrators and/or facilitators. Some exemplary uses may include, but are not limited to, meeting or training announcements and new program announcements. For example, meeting/training announcements may include a small amount of text identifying the intent of the meeting and its value proposition. The announcement may include video(s) to provide a participant with a preview of the presentation in snippets, thereby setting initial expectations for the participant. As noted above, the video may be altered programmatically to insert an intro segment, e.g., presented by a prominent personality, who makes a personal appeal and localizes the event. The body of the video, which may be repurposed for other, similar events, may be automatically stitched to the intro segment. In addition to the video, an online registration form may be provided to allow immediate fulfillment/registration. A data sheet may be included to serve as a downloadable event "brochure" to document agenda, speakers, venue information, etc. An announcement may also include a contact link to enable easy communication with the participant. An exemplary "New Program" announcement, however, may simply include a small amount of text positioning the program, a video explaining how the program works with illustrated screen shots and snippets of typical video content delivered by the program, an online registration form providing immediate fulfillment, and a downloadable e-book providing program details.

Figure 18A:
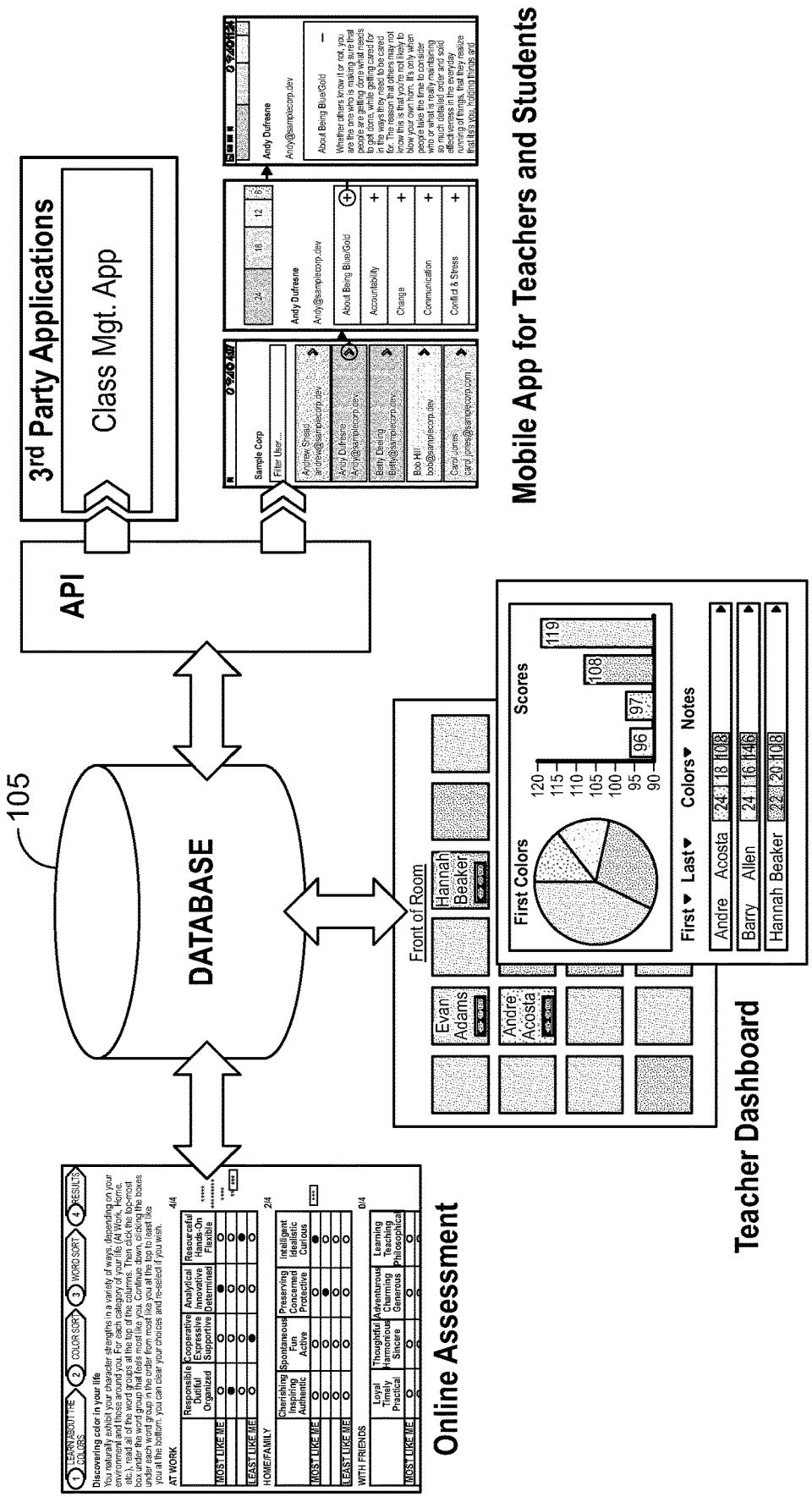
FIG. 18A illustrates an exemplary personal assessment service used in an educational environment.

Furthermore, in some embodiments, some or all of the PAS 100 may be optionally embeddable into 3rd party applications, systems, and/or products. For example, the PAS 100 may be incorporated into an educational setting, as demonstrated by the example shown in FIG. 18A. In this example, the users are generally comprised of students. As each student completes an assessment, the assessment information may be included in, and/or provided as an overlay to, to a classroom seating map. This information may advantageously permit an instructor to modify student seating, modify instructional material to suit students' assessment, and/or educate appropriately based on the displayed information. According to aspects of the present invention, the PAS 100 may provide one or more user interfaces including a "classroom dashboard". A classroom dashboard advantageously easily enables teachers to organize students in "Classrooms". Individual student information may be available to other students, teachers, teacher teams, school administration and board, and parents, according to account preference settings.

Figure 18B:
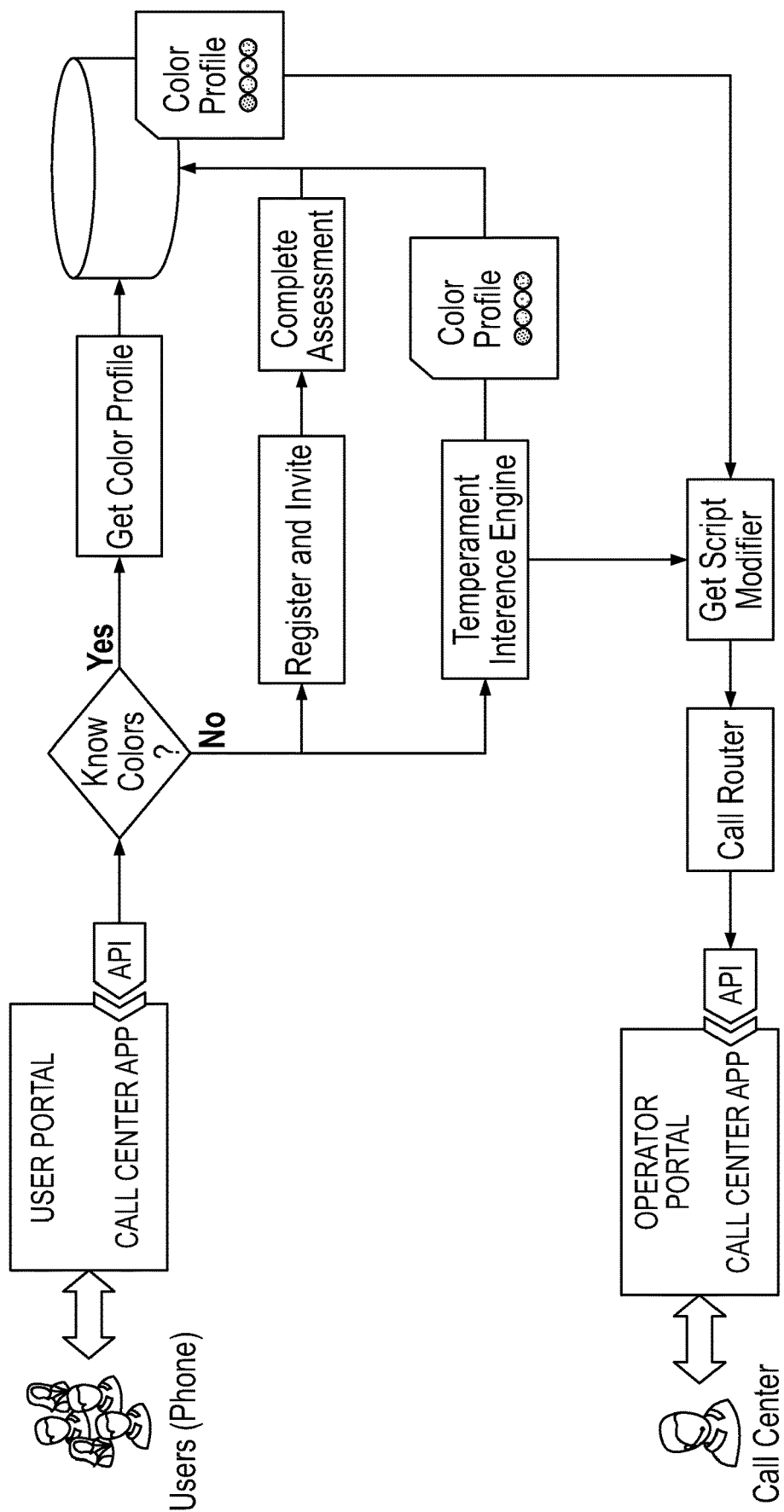
FIG. 18B illustrates an exemplary personal assessment service used in a call center environment, according to various aspects described herein.

In another example, as demonstrated in FIG. 18B, some or all of the PAS 100 may be embedded with call center applications/systems, where assessment information may be used in call centers to adjust support provided to a user, either by providing information to the user in accordance with the user's assessment information, by connecting users with compatible call center staff in accordance with the user's assessment information, or some combination thereof. In a call center environment, engagement typically drives results, i.e., the more accurately you can identify the caller's intrinsic values, the better chance there is to relate to that person as an individual. The PAS 100 may advantageously provide a deeper psychographic profile by identifying the individual's intrinsic values. For example, in order to match the caller to a coach with compatible values, call center systems may utilize assessment information to route calls to a coach who will relate naturally with the caller, improving customer satisfaction and results against performance metrics. In other words, the goal is to match callers with compatible coaches, inferring the caller's temperament if the color profiles do not exist in the database. The inference may initially characterize the caller to be either people-oriented or process-oriented and build accuracy over time. Call center router algorithms may be optimized over time using, among other things, iterations on subsequent inference events and including other available psychographic data. For example, a call center system embedding all or some of PAS 100 may initially match the caller to a compatible coach. If the caller's colors are known, a call router/system may attempt to assign the call to a coach whose first color matches the first color of the caller. If no coaches match, the router/system will attempt to match the caller's first color with a coach's second color. If the caller's color is not known, the router/system may auto-generate an invitation for the caller to complete an assessment and register in the database for future engagements. An inference engine may initially characterize the caller as either "people-oriented" or "process-oriented". By way of demonstration and not limitation, the router/system will attempt to route the call to a coach with high Blue or Orange if the caller is characterized as "people-oriented", or in the alternative, the router/system may attempt to route the call to a coach with high Green or Gold if the caller is characterized as "process-oriented".

It should be noted, however, that these environments are merely exemplary, and the PAS 100 may be used in other environments as appropriate, e.g., interrogations. Furthermore, the PAS 100 may additionally include neural-linguistic programming (NLP) functionality to programmatically derive personality traits based on words and phrases used by users in audible and written communication and voice patterns, in context with situational parameters, e.g., trouble support calls, health coaching, complaints, interrogations, etc.

According to aspects of the present invention, a computerized method provides a temperament assessment service executing on a centralized computing device to at least one reseller for resale to a user via a network. The method includes displaying, by the centralized computing device, a first reseller interface to the reseller via the temperament assessment service, with the first reseller interface displaying one or more selection elements. The method further includes receiving, by the centralized computing device, a first selection of one or more of the selection elements for performing at least one reseller function associated with each of the selection elements, with the reseller functions including a pricing model function for storing pricing information and a branding function for storing custom branding collateral associated with the reseller. The method additionally includes executing, by the centralized computing device, the reseller functions and displaying, by the centralized computing device, one or more branded user interfaces to the user via the temperament assessment service based on the stored custom branding collateral associated with the reseller. The branded user interfaces may include an online e-commerce store for user purchases. The method also includes calculating, by the centralized computing device, payments due to the reseller as a function of a reseller fee paid by the reseller and the user purchases. It should be understood that one or more systems and/or executable instructions stored on one or more computer-readable storage media may incorporate all or some of the steps, elements, and attributes described above.

According to aspects of the present invention, a computerized method provides a method for generating one or more mini-assessment applications, as described above, for conducting a temperament assessment related to an offer, with the offer being predefined via a temperament assessment service. The method includes generating one or more computer-executable applications incorporating the offer information, with the application providing one or more user interfaces for conducting an assessment. The method further includes providing access to the application via an offer link associated with the defined offer, with the application optionally including at least a registration user interface for displaying a registration form for recipient completion When the offer recipient executes the application and completes an assessment, the method further includes receiving assessment and registration information from the recipient and then storing the information in a data store, such as database 105. The method additionally includes storing an indicator in the data store of offer redemption by the recipient.

Embodiments of system 100 may include one or more special purpose or general purpose computers and/or computer processors including a variety of computer hardware. Embodiments of device 101 may further include one or more computer-readable storage media having stored thereon firmware instructions that the computer executes to operate the device as described below. In one or more embodiments, the computer and/or computer processor are located inside the device 100, while in other embodiments, the computer and/or computer processor are located outside or external to device 101.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although the subject matter has been described in language specific to structural features and/or methodologies, it is to be understood that the subject matter defined in the appended claims is not necessarily limited to the specific features or acts described above. Rather, the specific features and acts described above are disclosed as example forms of implementing the claims.

What is claimed is:

1. A computerized method for assessing one or more temperament characteristics of a registered user by a centralized computing device via a network, the method comprising:
storing data related to a plurality of user profiles each including a unique API key;
receiving a request to access a user profile, wherein the request includes a unique API key indicating service access privileges for the user profile; and
granting access to the user profile based on the received unique API key and the stored data;
displaying, to a user, a first user interface including at least two color elements for a first user selection, the at least two color elements each including an associated set of one or more displayed words related to traits and characteristics;
receiving the first user selection based on the first user interface;
determining a contextual temperament assessment based on the received first user selection, the contextual temperament assessment including a plurality of temperament depictions representative of the user in a plurality of the associated situational contexts based on the received first user selection and the received second user selection; and
displaying, to the user, the determined contextual temperament assessment based on a predetermined situational context.

2. The method of claim 1, wherein the first user selection is indicative of a sort order of the associated set, the associated set sort order indicative of a scale ranging from "most like me" to "least like me".

3. The method of claim 1 further comprising:
displaying, to the user, a second user interface including at least two word groupings for a second user selection, each word grouping having an associated situational context, the second user selection indicative of a sort order of the word groupings, the word grouping sort order indicative of a scale ranging from "most like me" to "least like me";
receiving the second user selection based on the second user interface; and
determining the contextual temperament assessment based on the received first user selection and the received second user selection.

4. The method of claim 3, wherein the contextual temperament assessment includes a plurality of temperament depictions representative of the user in a plurality of the associated situational contexts based on the received first user selection and the received second user selection.

5. The method of claim 1 further comprising weighting the contextual temperament assessment on the basis of the received first user selection.

6. The method of claim 1 further comprising displaying a third user interface displaying the determined contextual temperament assessment relative to one or more the plurality of additional determined contextual temperament assessments.

7. The method of claim 1 further comprising storing the determined contextual temperament assessment in a database accessible by a centralized computing device, wherein the database stores a plurality of additional determined contextual temperament assessments of a plurality of registered users.

8. The method of claim 7 further comprising:
generating a group containing a subset of the plurality of registered users, wherein each registered user of the plurality of registered users includes a contextual temperament assessment;
aggregating the plurality of contextual temperament assessments associated with the group;
determining a group contextual temperament assessment based on the aggregated plurality of contextual temperament assessments; and
displaying the group contextual temperament assessment.

9. The method of claim 1, wherein each associated situational context comprises one of a "at work" context, a "home/family" context, a "with friends context", a "my world-view" context, and a "my self-view" context.

10. The method of claim 1, wherein the predetermined situational context comprises one of a "at work" context, a "home/family" context, a "with friends context", a "my world-view" context, and a "my self-view" context, wherein the method further comprises filtering the determined contextual temperament assessment according to the predetermined situational context.

11. The method of claim 1 further comprising providing a document accessible to the user, the document including one or more informational elements related to the determined contextual temperament assessment.

12. A computer device for providing a temperament assessment service, said computer device comprising at least one processor in communication with at least one memory device, said computer device in communication with a user computer device, and wherein said computer device programmed to:
store data related to a plurality of user profiles each including a unique API key;
receive a request to access a user profile, wherein the request includes a unique API key indicating service access privileges for the user profile; and
grant access to the user profile based on the received unique API key and the stored data;
instruct, the user computer device, to display a first user interface including at least two color elements for a first user selection to a user of the user computer device, the at least two color elements each including an associated set of one or more displayed words related to traits and characteristics;
receive, from the user computer device, the first user selection based on the first user interface;
determine a contextual temperament assessment based on the received first user selection, the contextual temperament assessment including a plurality of temperament depictions representative of the user in a plurality of the associated situational contexts based on the received first user selection and the received second user selection; and
instruct, the user computer device, to display the determined contextual temperament assessment based on a predetermined situational context to the user.

13. The computer device of claim 12, wherein the first user selection is indicative of a sort order of the associated set, the associated set sort order indicative of a scale ranging from "most like me" to "least like me".

14. The user computer device of claim 12, wherein said computer device is further programmed to:
instruct, the user computer device, to display a second user interface including at least two word groupings for a second user selection to the user, each word grouping having an associated situational context, the second user selection indicative of a sort order of the word groupings, the word grouping sort order indicative of a scale ranging from "most like me" to "least like me";

receive, from the user computer device, the second user selection based on the second user interface; and determine the contextual temperament assessment based on the received first user selection and the received second user selection.

15. The computer device of claim 14, wherein the contextual temperament assessment includes a plurality of temperament depictions representative of the user in a plurality of the associated situational contexts based on the received first user selection and the received second user selection.

16. The computer device of claim 12, wherein the computer device is further programmed to store the determined contextual temperament assessment in a database accessible by a centralized computing device, wherein the database stores a plurality of additional determined contextual temperament assessments of a plurality of registered users.

17. The computer device of claim 16, wherein the computer device is further programmed to:

generate a group containing a subset of the plurality of registered users, wherein each registered user of the plurality of registered users includes a contextual temperament assessment;

aggregate the plurality of contextual temperament assessments associated with the group;

determine a group contextual temperament assessment based on the aggregated plurality of contextual temperament assessments; and instruct the user computer device to display the group contextual temperament assessment.

18. The computer device of claim 12, wherein each associated situational context comprises one of a "at work" context, a "home/family" context, a "with friends context", a "my world-view" context, and a "my self-view" context, and wherein the predetermined situational context comprises one of a "at work" context, a "home/family" context, a "with friends context", a "my world-view" context, and a "my self-view" context, wherein the method further comprises filtering the determined contextual temperament assessment according to the predetermined situational context.

19. The computer device of claim 12, wherein the computer device is further programmed to weight the contextual temperament assessment on the basis of the received first user selection.

20. The computer device of claim 12, wherein the computer device is further programmed to display a third user interface displaying the determined contextual temperament assessment relative to one or more the plurality of additional determined contextual temperament assessments.

* * * * *